United States Patent [19]

Kametani

[11] Patent Number: 5,537,602

[45] Date of Patent: Jul. 16, 1996

[54] PROCESS SYSTEM FOR CONTROLLING BUS SYSTEM TO COMMUNICATE DATA BETWEEN RESOURCE AND PROCESSOR

[75] Inventor: Masatsugu Kametani, Tsuchiura, Japan

[73] Assignee: Hitachi, Ltd., Tokyo, Japan

[21] Appl. No.: 288,356

[22] Filed: Aug. 10, 1994

Related U.S. Application Data

[63] Continuation-in-part of Ser. No. 59,731, May 11, 1993, Pat. No. 5,367,662.

[30] Foreign Application Priority Data

Sep. 16, 1988 [JP] Japan ................................. 63-230007
Sep. 17, 1993 [JP] Japan ................................. 5-231264

[51] Int. Cl.⁶ ............................................... G06F 13/00
[52] U.S. Cl. ................ 395/800; 364/239.5; 364/231.4; 364/231.5; 364/242.33; 364/DIG. 1; 395/427
[58] Field of Search ............................... 395/425, 800, 395/427, 848

[56] References Cited

U.S. PATENT DOCUMENTS

| | | | |
|---|---|---|---|
| 3,577,128 | 5/1971 | Crisimagna | 395/550 |
| 3,774,157 | 11/1973 | Tsui | 395/550 |
| 4,063,308 | 12/1977 | Collins | 395/550 |
| 4,095,265 | 6/1978 | Vrba | 395/425 |
| 4,095,267 | 6/1978 | Morimoto | 395/550 |
| 4,223,392 | 9/1980 | Lemaire | 395/550 |
| 4,229,791 | 10/1980 | Levy | 395/301 |
| 4,419,739 | 12/1982 | Blum | 395/550 |
| 4,503,490 | 3/1985 | Thompson | 395/550 |
| 4,727,477 | 2/1988 | Garvil | 395/800 |
| 4,802,120 | 1/1989 | McCoy | 395/550 |
| 4,835,728 | 5/1989 | Si | 395/550 |
| 4,989,175 | 1/1991 | Boris | 395/550 |
| 5,036,456 | 7/1991 | Koegel | 395/425 |
| 5,097,437 | 3/1992 | Carson | 395/775 |
| 5,220,651 | 6/1993 | Larson | 395/250 |
| 5,313,603 | 5/1994 | Takishima | 395/425 |

OTHER PUBLICATIONS

Intel Microprocessor and Peripheral Handbook, vol. I 1987, 3–34 to 3–35.

*Primary Examiner*—Eric Coleman
*Attorney, Agent, or Firm*—Antonelli, Terry, Stout & Kraus

[57] ABSTRACT

A processor system includes an external resource, and a main CPU with a built-in bus control mechanism outputting an address bus and control signals and having a function to access the external resource and input and output necessary data through a data bus. The external resource includes a plurality of external resources. Controllers for outputting control signals and address signals to access the external resources by using a plurality of address strobe signals from the main CPU are provided for the external resources, respectively. The external resources input and output data with the main CPU through the data bus by the signals from the controllers. Real time processing for the respective types of instructions is attained.

21 Claims, 13 Drawing Sheets

EXAMPLE 1 OF INTERLOCK CONTROL BETWEEN BUS CYCLES IN ALTERNATIVE BUS CYCLE

EXAMPLE 2 OF INTERLOCK CONTROL BETWEEN BUS CYCLES IN ALTERNATIVE BUS CYCLE

EXAMPLE 1 OF ALTERNATIVE BUS STATE (ABS) BY FOUR ADDRESS
CONTROL SIGNALS (BASIC BUS CYCLE COMPRISES TWO BUS STATES)

EXAMPLE 2 OF ALTERNATIVE BUS STATE (ABS) BY FOUR ADDRESS CONTROL SIGNALS (BASIC BUS CYCLE COMPRISES TWO BUS STATES)

PROCESS SYSTEM FOR CONTROLLING BUS SYSTEM TO COMMUNICATE DATA BETWEEN RESOURCE AND PROCESSOR

CROSS-REFERENCE TO RELATED APPLICATIONS

The present application is a continuation-in-part application of the application Ser. No. 08/059,731 filed by M. Kametani on May 11, 1993 entitled "Distributed Machine State Controlled Processor System" now U.S. Pat. No. 5,367,662". The content thereof is incorporated herein by referencing the number.

BACKGROUND OF THE INVENTION

The present invention relates to a bus system which permits data communication with a high efficiency between an external resource and a processing unit, which is suitable for a processing unit such as a controlling computer for which a high real time processing ability is required.

In the processor system described in the above-mentioned application, machine state controllers for generating access control signals to external resources are distributedly arranged in a group of multi-divided external resources, and the machine state controllers are operated in parallel in synchronism with a plurality of system basic clocks which have a most advanced phase are adjusted in phase. The machine state controllers pre-decode an internal state signal of a CPU to locally generate a bus cycle prior to the start of the access by the CPU to conduct the pre-access to the resource so that a delay in an input/output buffer of the machine state controller is avoided. By locally generating the bus cycle prior to the start of the access by the CPU and conducting the pre-access to resource, the high speed operation and assurance of access time are attained. For the control items which require various kinds of data processing and the control items whose contents of processing and data to be handled dynamically change, the addresses at which the data to be processed are present randomly change and the execution unit in the processing unit cannot acquire necessary data in each machine cycle or bus cycle.

The above problem is not very serious in a normal computer utilization environment in which vector type numeric processing in a static environment is the principal processing, but it is particularly serious in a utilization environment such as a controlling computer in which dynamic problems are to be processed in real time.

In a processing system having a complex processing algorithm and a close linkage to an external environment such as a large scale CAD system, the random data processing and the frequency of access to the external resource significantly increase, and real time performance comparable to that of the dynamic processing system is required. It is considered that use of such a system will increase in future and the above problem will become serious even in the general utilization environment.

In a control application, since the feedback between the resource and the processing units (a processing unit processes based on the data of the resource, the processed result is returned to the resource, another processing unit controls a control item based on the returned result and the other processing unit feeds back the control result as resource data) frequently occurs, the delay due to the feedback causes a reduction of the real time performance.

SUMMARY OF THE INVENTION

It is an object of the present invention to provide a bus system which can further enhance the real time performance.

It is another object of the present invention to provide a system which permits a data operation with a high efficiency in a real time environment as represented by a real time control application, and which assures a long access time as viewed from a resource without lowering the bus transfer throughput, permits data transfer at a maximum rate processor clock (a clock for determining a minimum bus cycle) even in the random access to the resource, and can keep a short access delay from the issuance of an access request to the resource by the CPU to the acquisition of the required data.

It is another object of the present invention to provide a system which permits a processing unit therein to directly process data supplied from the resource and directly return the processed result to the resource so that the real time performance of the process is further enhanced.

In order to achieve the above objects, the processor system of the present invention comprises an external resource and a main CPU with a built-in bus control mechanism having a function to access the external resource and input and output necessary data through a data bus. The external resource includes a plurality of external resources. The processor system includes controllers, one for each of the external resources, for receiving an address strobe signal from the main CPU to output to the external resources a control signal and an address signal to access said external resources. The external resources input and output data with the main CPU through the data bus as directed by the control signal and the address signal from said controller.

When viewed from each external resource, it is accessed in a bus cycle comprising two processor cycles, and when viewed from the CPU, it may be continuously and randomly accessed in the bus cycle of one processor cycle. Thus, a long access time as viewed from the external resource can be assured without lowering the bus transfer throughput. Further, in the random access to the external resource, the data can be transferred at the maximum processor clock (the clock for determining the minimum bus cycle) cycle. Further, since the CPU may be constructed to permit the direct and high efficiency random access to the external resource, the short access delay from the issuance of the access request by the CPU to the external resource to the acquisition of the required data is maintained.

DETAILED DESCRIPTION OF THE PREFERRED EMBODIMENTS

Figure 1:
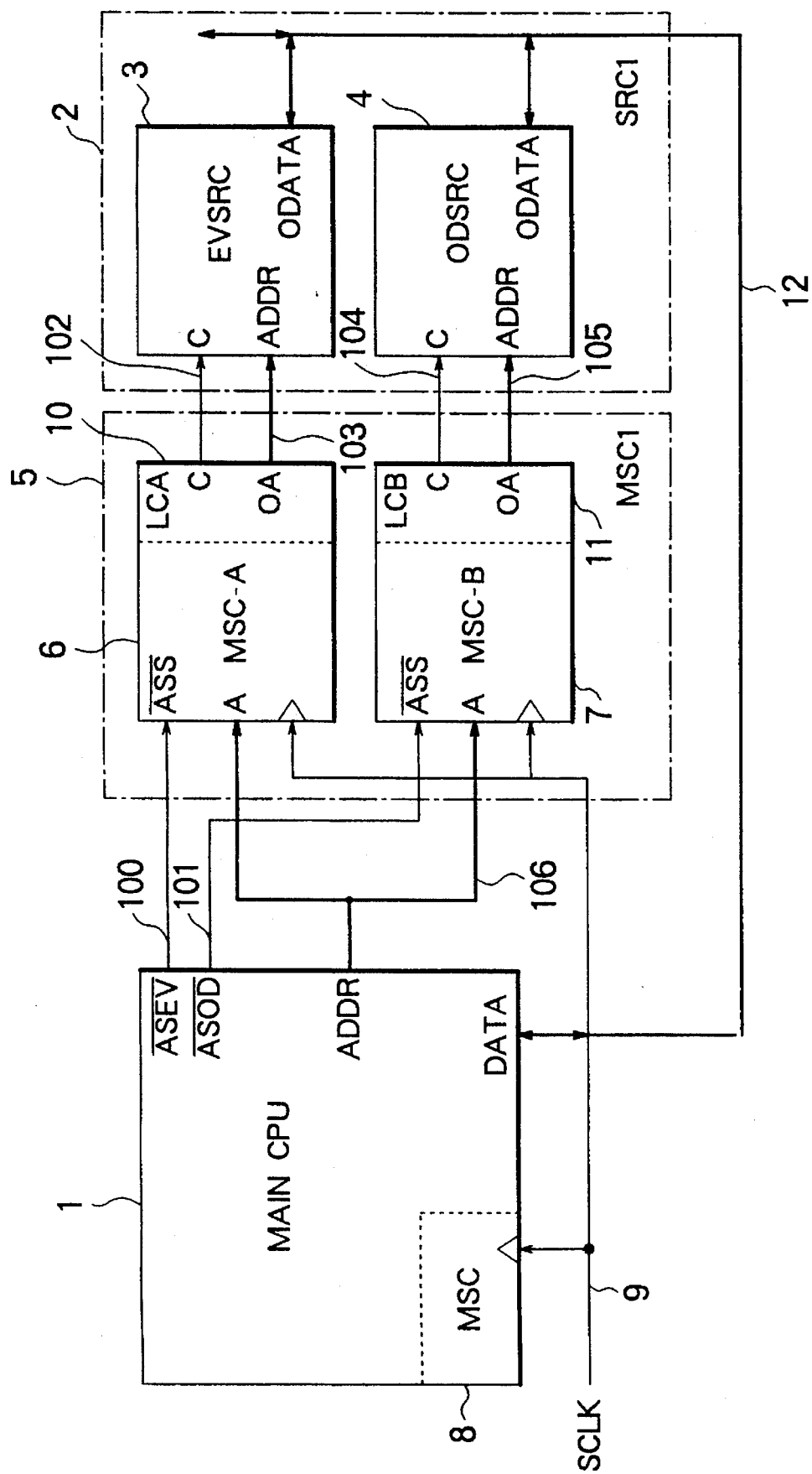
FIG. 1 shows a configuration of an embodiment of a processor system of the present invention.

FIG. 1 shows a block diagram of one embodiment of the processor system of the present invention. In FIG. 1, a resource 2 comprises a first resource (EVSRC) 3 which is addressed by an even address as viewed from a main CPU 1, and a second resource (ODSRC) 4 which is addressed by an odd address as viewed from the main CPU 1.

A machine state controller (MSC) 5 which controls the sending of a machine state to the resource 2 comprises a first machine state controller (MSC-A) 6 having a built-in access control function to the first resource (EVSRC) 3 and a second machine state controller (MSC-B) 7 having a built-in access control function to the second resource (ODSRC) 4.

The main CPU 1 comprises a third machine state controller (MSC) 8 which generates an access control signal to the resource through the MSC-A and the MSC-B. The first machine state controller (MSC-A) 6, the second machine state controller (MSC-B) 7 and the third machine state controller (MSC) 8 in the present embodiment are operated by using system basic clocks (SCLK) of the same level from a signal line 9 as a reference.

As described above, the machine state controller (MSC) 5 is separated to correspond to the two resources 3 and 4. The first machine state controller (MSC-A) 6 and the second machine state controller (MSC-B) 7 of the machine state controller (MSC) 5 have local access controllers (LCA, LCB) 10 and 11, respectively, which operate to control the resources 3 and 4 in response to a reference signal (Refer to the Specification of Application Ser. No. 08/059,731 now U.S. Pat. No. 5,367,662) from the machine state controllers (MSC's) 6 and 7.

Numeral 12 denotes a bus for connecting the main CPU 1 with the first resource (EVSRC) 3 and the second resource (ODSRC) 4.

The main CPU outputs an address strobe signal ($\overline{AS}$) to the resources 3 and 4. The address strobe signal ($\overline{AS}$) is separated to a signal ($\overline{ASEV}$) which is outputted in the generation of an even address and a signal ($\overline{ASOD}$) which is outputted in the generation of an odd address. The signal ($\overline{ASEV}$) is supplied to an address strobe input ($\overline{ASS}$) of the first machine state controller (MSC-A) via a signal line 100, and the signal ($\overline{ASOD}$) is supplied to an address strobe input ($\overline{ASS}$) of the second machine state controller (MSC-B) via a signal line 101. The local controllers (LCA, LCB) 10 and 11 of the first machine controller (MSC-A) 6 and the second machine state controller (MSC-B) 7 output access control signals C on control signal lines 102 and 104 and address signals OA on address signal lines 103–105 to access the resources 3 and 4, respectively, by using the reference signal s from the machine state controllers (MSC-A, MSC-B) 6 and 7. In response thereto, the first resource (EVSRC) 3 and the second resource (ODSRC) 4 input and output data with the main CPU 1 through the data bus 12.

After the first machine state controller (MSC-A) 6 and the second machine state controller (MSC-B) 7 have acquired the address signals (ADDR) from the main CPU 1 via a signal line 106, the address signal OA is latched for a predetermined cycle period in the local controllers (LCA, LCB) 10 and 11 by address latch enable signals EAL and OAL, respectively, and then they are supplied to the resources 3 and 4, respectively.

Figure 2:
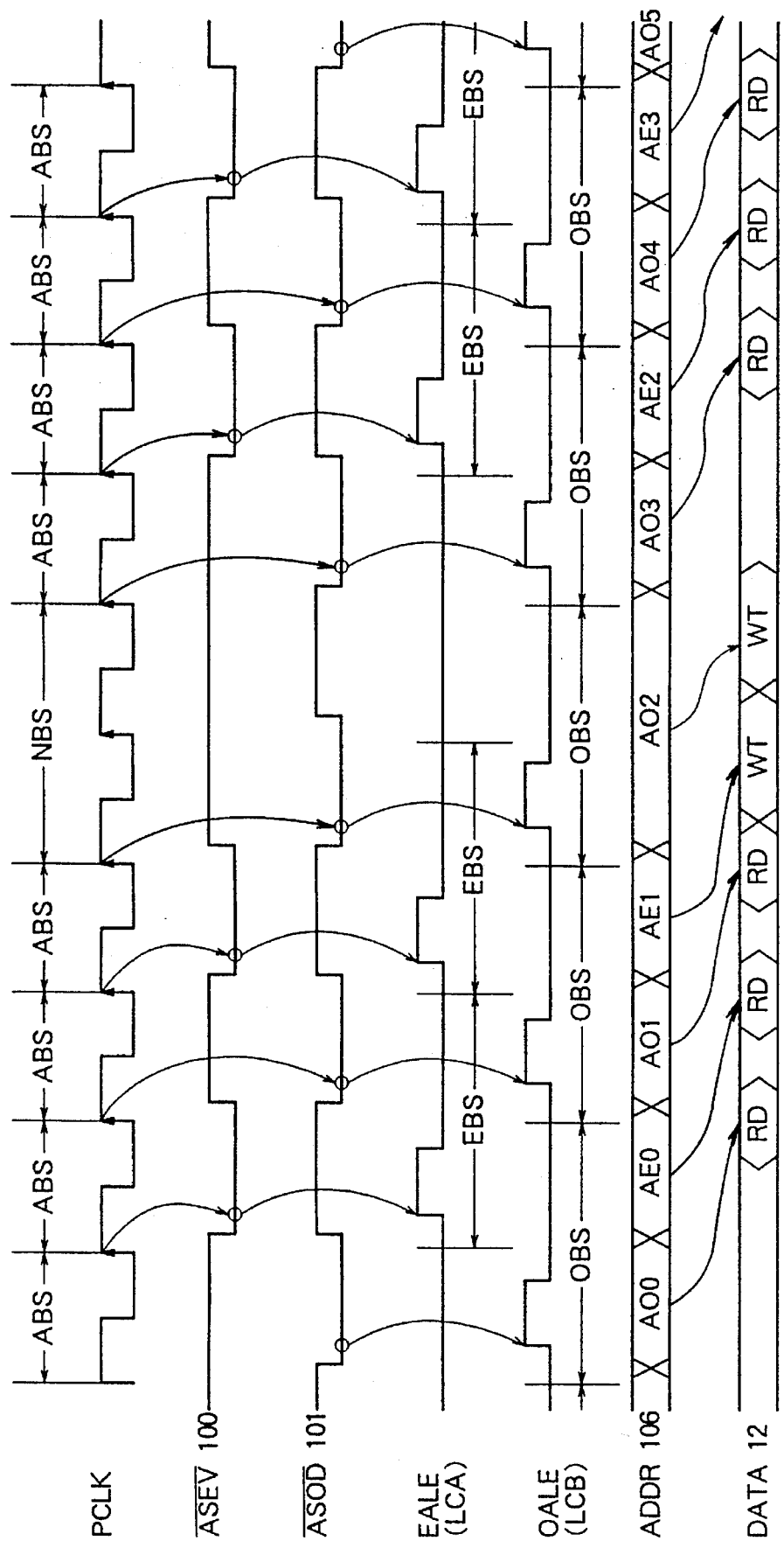
FIG. 2 shows a time chart of a random alternative bus cycle (ABS) in the embodiment shown in FIG. 1 of the processor system of the present invention.

FIG. 2 shows an example of the random alternative bus cycle in the embodiment of the present invention. In FIG. 2, for the even address AE and the odd address AO generated on the address (ADDR) signals 103 and 105, the address strobe signals ($\overline{ASEV}$, $\overline{ASOD}$) are generated as signals which indicate the start of the bus cycle as well as the active state of the address. The main CPU 1 has a function to output the odd address AO, the even address AE and the address strobe signals ($\overline{ASEV}$, $\overline{ASOD}$) sequentially for each processor clock cycle PCLK (shown in FIG. 2. In FIG. 1, it is assumed that it is generated as the internal signal of the MSC's 6, 7 and 8) which is a basic clock of the bus cycle when the even addresses AE and the odd addresses AO can be alternately outputted. As a result, the address strobe signals ($\overline{ASEV}$) and the address strobe signals ($\overline{ASOD}$) are alternately outputted.

When continuous accessing to the same resource is to be made, that is, when the even addresses AE are continuous or the odd addresses AO are continuous, the machine state controller (MSC) in the main CPU 1 detects it by comparing the bits of the immediately previous address and those of the address currently being extracted and secures two bus cycles of the processor clock PCLK and generates the same address strobe as the previous one. (In FIG. 2, the outputs of the continuous addresses AO2 and AO3 correspond thereto.) The address strobe for which a valid address is not outputted maintains a non-active sate. (In FIG. 2, when the addresses AO2 and AO3 are continuous, the address strobe ($\overline{ASEV}$) for the even address AE remains high.) The address information on the ADDR is latched in the local controllers (LCA, LCB) 10 and 11 by the address latch enable signals (EALE, OALE).

The address latch enable signal (EALE) is generated by the address strobe signal ($\overline{ASEV}$), and the address latch enable signal (OALE) is generated by the address strobe signal ($\overline{ASOD}$) at the timing shown in FIG. 2. When viewed from the first resource (EVSRC) 3 and the second resource (ODSRC) 4, they are observed as the even bus cycle EBS and the odd bus cycle OBS. In each bus cycle period of the even bus cycle EBS and the odd bus cycle OBS, two address outputs AO from the first machine state controller (MSC-A) 6 and the second machine state controller (MSC-B) 7 for the first resource (EVSRC) 3 and the second resource (ODSRC) 4, respectively, are fixed (the addresses derived by latching the address information on the ADDR by the address latch enable signal EALE and the address latch enable signal OALE) to specify the locations of the target data in the resources 3 and 4.

In accordance with the present invention, as seen from FIG. 2, the even bus cycle EBS and the odd bus cycle OBS for the resources 3 and 4 always secure two processor clock cycle (PCLK×2) period so that the long access time to access the resource is secured.

The bus transfer throughput is equivalent to that of the prior art system in which the bus cycle is generated for each processor clock, and the addressing may be done in any number of bus cycles. It may be said that the information quantity on the address ADDR and the data DATA represent the throughput.

In the present invention, the continuously generated random bus cycles each having one processor clock as viewed from the main CPU 1 are referred to as alternative bus state ABS or cycle, and the bus cycle in two processor clocks when two or more even addresses AE or odd addresses AO continue are refereed to as normal bus cycle (NBS). Since the resource directly connected to the main CPU 1 usually requires the access period of two or more processor clocks, the direct connection in the prior art system allows only the resource access in the normal bus state. Namely, in the present invention, the throughput is approximately double that of the prior art system, while two the access period for the resource of two processor clocks is secured as it is in the prior art system.

In accordance with the present invention, when the addressing is completed in the main CPU 1, the main CPU 1 outputs the address strobe signals ($\overline{ASEV}$, $\overline{ASOD}$) as well as the address signal ADDR which is the target for the external so that the accessing to the resource is attained at an earlier timing than that of the generation of the alternative bus state ABS after externally decoding the address. Thus, longer access time may be secured.

When the alternative bus state ABS is externally generated, it is necessary to control the main CPU 1 to wait when continuous accesses to the same resource occur. It is very difficult in terms of timing to externally process the generation of the CPU control information and the transfer thereof to the CPU 1. In accordance with the present invention, since the continuous accessing to the same resource can be determined when the main CPU 1 completes the addressing therein, it is possible to generate the alternative bus state ABS easily and at an earlier timing.

In the present embodiment, the resource 2 is separated into two resources (EVSRC, ODSRC) 3 and 4, although it may be separated to more (three or more) resources, and machine state controllers (MSC) for controlling the accessing may be provided correspondingly, and address strobe signals corresponding to the resources and the machine state controllers may be provided in the main CPU to conduct the access control in the same manner as that described above. In this manner, the alternative bus state ABS in one processor clock is attained with a higher probability. In the random access environment, when the resource is separated into two resources as it is in the embodiment described above, and they are controlled by two address strobes, a probability to conduct the alternative bus state ABS is 50%. When the resource is separated to three and the resources are allocated to the addresses corresponding to the remainder of three, the alternative bus state ABS may be conducted at the probability of 66%. In general, when n resources and corresponding strobe signals are provided, the alternative bus state ABS may be conducted at the probability of $(1-1/n)\times 100\%$.

In accordance with the present invention, it is sufficient that one data bus and one address bus, as viewed from the CPU, communicate with the CPU. Thus, the main CPU 1 may be constructed with the same number of pins as that of the prior system and the cost performance is improved.

It is apparent that the present invention enables high efficiency as the bus transfer protocol without using the prior art distributed machine state control technique, but when it is combined with the prior art distributed machine state control, a longer access time can be secured.

FIGS. 3 to 6 show another embodiment of the processor system of the present invention. The present embodiment permits the processing of a more advanced system and it is operable even if a conventional bus cycle (normal bus state NBS, pipeline bus state PBS, burst bus state BBS) is mixedly present.

The present embodiment has as main CPU 1 (central numeric operation processing unit) which is a principal unit and will be described in detail in connection with FIG. 3 and comprises a plurality of machine state controllers 5 including access control mechanisms to the resource 2 and a plurality of groups of resources grouped by the type of bus cycle. The main CPU 1 has a high performance random access bus system having a high real time performance to allow direct processing of data of a main memory or external resource.

Figure 4:
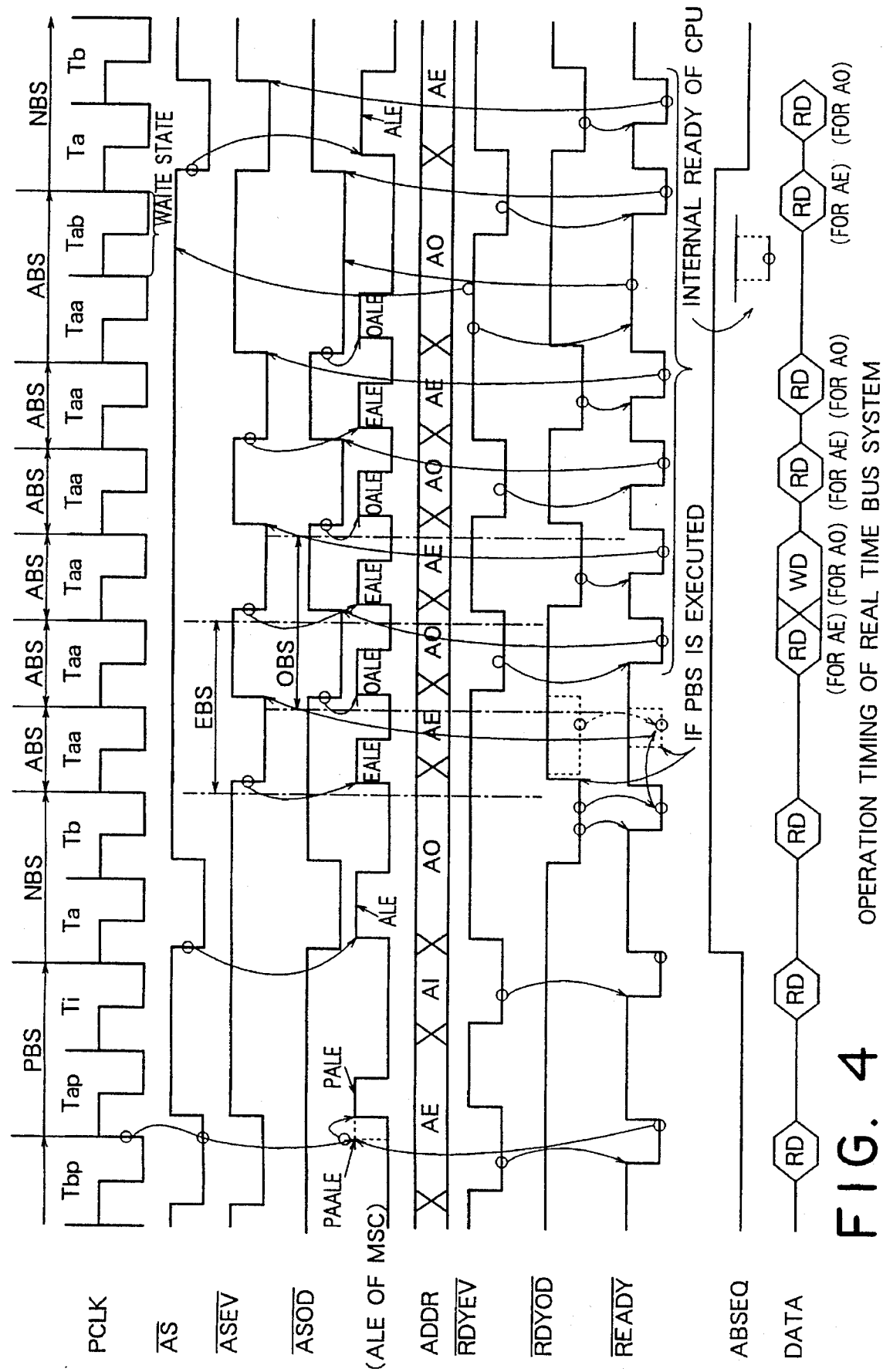
FIG. 4 shows a timing chart of an operational timing cycle of the embodiment shown in FIG. 3 of the processor system of the present invention.

FIG. 4 shows the basic operational timing. The present bus system is simply referred to as a real time bus system. The function and the operational timing thereof are explained in connection with FIG. 4.

When the main CPU 1 processes an instruction to refer the memory, it starts the bus cycle to refer the external memory, and when the memory address to be accessed is determined by the addressing unit, it pre-transfer the address (ADR) together with the address strobe ($\overline{AS}$) to start the bus cycle in advance to the operation of an execution unit. Thus, when the execution unit starts the processing of the instruction, the bus cycle has already been started so that idling due to waiting for the supply of data of the execution unit is reduced.

As shown in FIG. 4, when the even address (AE) and the odd address (AO) are alternately addressed, the bus cycle may be completed in substantially one processor cycle, and the bus cycle is placed in the alternative bus state (ABS) and the bus cycle by the even address (AE) and the bus cycle by the odd address (AO) are separated by the address strobes ($\overline{ASEV}$, $\overline{ASOD}$) and distributed to the even resource (EVSRC) and the odd resource (ODSRC). The two bus states thus developed comprise two processor clocks, respectively. The alternative bus state (ABS) is started by the alternative bus state request (ABSREQ) from the resource. When the alternative bus state (ABS) is to be terminated, a ready signal ($\overline{RDYEV}$) and a ready signal ($\overline{RDYOD}$) should be sent back to the main CPU 1 from the even source (EVSRC) and the odd source (ODSRC), respectively. (If the ready signal is not sent back, the wait state is continuously inserted until it is sent back.)

If the addressing of the continuous even addresses or odd addresses occurs in the alternative bus state (ABS), one wait state (one processor cycle) is automatically inserted in the alternative bus state (ABS) and the two-processor cycle bus access corresponding to the normal bus state (NBS) is executed.

The normal bus cycle comprises the normal bus state (NBS) and the pipeline bus state (PBS) and the bus cycle is terminated by sending back the ready signal (READY). In the pipeline bus state (PBS), data may be accessed by utilizing the bus cycle 100% by the address pipelining in which the address is pre-transferred more than one processor cycle before the start of the actual bus cycle. In this manner, the longer access time to the resource is secured. The shift to the pipeline bus state (PBS) may be done by delaying the send-back of the ready signal by one or more processor clock. The address strobe ($\overline{AS}$) is kept active until the shift to the pipeline bus state (PBS), and when an active ready signal is sent back, it returns to non-active. In the normal bus state (NBS), the address (ADDR) is outputted in the top bus cycle state to render the address strobe ($\overline{AS}$) active to start the bus cycle. Accordingly, the address access time is not as long as that of the pipeline state (PBS), but the access delay for the main CPU 1 (a time from the start of the access of the data by the addressing unit to the fetch of the data into the CPU) in the read access of the operand data can be highly probably suppressed smaller than that of the pipeline bus state (PBS). The normal bus state (NBS) and the pipeline bus state (PBS) comprise two processor cycles, respectively.

Continuous data transfer in substantially one processor cycle by the burst bus state (BBS) is also supported. The burst bus state (BBS) may be regarded as a functionally reduced bus state of the alternative bus state (ABS). In the burst bus state (BBS), for simply continuous addresses, the word data of the even addresses and the word data of the odd addresses are alternately accessed. It is suitable to the fetching of vector type data or instruction data. When a conventional high speed general purpose CPU is used as an IU, it usually is provided with a burst transfer mode as a high speed bus cycle mode. Thus, this function may be utilized on the architecture of the present invention.

In FIG. 4, the ready signal ($\overline{READY}$) indicates the end of bus cycle (Lo active) in the normal state (NBS) and the pipeline bus state (PBS). The main CPU 1 determines based on the end of bus cycle ready signal ($\overline{RDY}$) sent back to the main CPU from the resource accessed in the normal bus state (NBS) mode and the pipeline bus state (PBS) mode and the internal state of the main CPU (whether the end of bus cycle is ready or not), and if the end of bus cycle is finally ready, the main CPU 1 render a signal ($\overline{CPURDY}$) active (Lo level). The signal ($\overline{CPURDY}$) is supplied to a ($\overline{READY}$) input of a machine state controller (MSC) of each resource and used to control the start and the end of the bus state and the bus command.

As described above, the basic bus cycle of the normal bus state (NBS) and the pipeline bus state (PBS) ends in two processor cycles unless a wait state is inserted. The normal bus state (NBS) provides a substantial access time corresponding to approximately two processor cycles, and the pipeline state (PBS) provides a substantial access time of approximately 1.5 processor cycles to the resource. As to the alternative bus state (ABS), when viewed from the even resource (EVSRC), it is observed as the bus state (even bus state EBS) of two processor cycles corresponding to the NBS until the signal ($\overline{ASEV}$) shifts to active (Lo). When viewed from the odd resource (ODSRC), it is observed as the bus state (odd bus state OBS) corresponding to the normal bus state (NBS). As to the burst bus state (BBS), it is identical to the alternative bus state (ABS), and when viewed from the resource (EVSRC) and the resource (ODSRC), it is observed as the bus state (EBS) and the bus state (OBS) corresponding to the normal bus state (NBS).

As described above, when viewed from the resource, at least two processor cycles are secured in any bus state so that a longer access time to one processor clock bus cycle is attained.

In the present invention, most of the resources of the real time bus system may be accessed in the alternative bus state (ABS). Unlike the access by the bus cycle in the burst bus state (BBS) or the prior art transfer type bus cycle, the access by the alternative bus state (ABS) has the following characteristics and advantages:

(a) In the alternative bus state (ABS) mode, the access overhead does not occur even if totally different high order addresses are designated between the odd resource and the even resource so long as the odd resource and the even resource are alternately accessed, because separate address buses for designating the high order addresses are provided for the odd resource and the even resource. Even if the processor (the main CPU in the present invention) cannot conduct the access to continuous addresses (highly random access), the wait state is inserted in the bus cycle so that the probability of the occurrence of the access overhead is suppressed to lower than 50%. This means that the random access performance required in the real time processing environment is maintained very high.

(b) In the prior art transfer bus, it is necessary that the number of data transferred is fixed or previously designated. In the access by the alternative bus state (ABS), no such restriction is imparted.

(c) When viewed from the resource, the system may be designed with similar access timing to that of other general basic bus cycles (NBS, PBS). Thus, a longer access time than that of the prior bus cycle may be assured.

In the present embodiment, the resources to be accessed are divided into two, the resources (EVSRC) and the resources (ODSRC) depending on whether the least significant bit defining the word border line is even (0) or odd (1), like the alternative bus state (ABS) mode, and they are allotted on the address map, although a greater number of low order address bits (AL) may be used. Namely, the address bus may be divided into two address buses for generating the high order address (AH) and the low order address bus (AL), two or more external resources may be provided, a plurality of groups of some specific addresses of the addresses represented by the low order addresses (AL) may be provided and the external resources are allocated to these groups, a plurality of address strobe signals corresponding to the groups of the specific addresses may be provided, and the corresponding address strobe signals may be outputted from the main CPU to the external in timing with the output of the low order addresses (AL) of the groups corresponding the address strobe signals to the corresponding external resources through the low order address bus.

In the light of the above, an effective bus band of a 32-bit real time processor system is explained.

Assuming that the ratio of the alternative bus state (ABS) (including the burst bus state (BBS)) is ABSR and the bus band utilization rate is BBUR, a bus state other than the alternative bus state (ABS) requires two processor clocks, and the bus band utilization rate is 0.5. Thus, in general, the bus band utilization rate is given by BBUR=ABSR+0.5·(1-ABSR). Assuming that the bus band utilization rate BBUR in accessing the instruction data is BBURi, the bus band utilization rate BBUR in accessing the operand data is BBURd, the ratio of the instruction data fetch bus cycle if IDBR and the ratio of the operand data bus cycle is ODBR, the ratio of the effective bus band of the processor PDbb and the maximum bus band PDMbb, that is, the bus band utilization rate PDbb/PDMbb is given by;

$$PDbb/PDMbb=BBURi·IDBR+BBURd·ODBR$$

where 1−IDBR−ODBR corresponds to the ratio of the ideal bus state (which is an invalid bus state in which it does not function as the bus cycle) which depends on the internal state of the main CPU and the application.

In an average real time processing application in the present invention, BBURD=0.975, BBURD=0.9, IDBR=0.065 and ODBR=0.765. In this case, the bus band utilization rate PDbb/PDMbb=0.752.

Assuming a most dynamic real time processing environment in which all instruction data are fetched from the main memory system, IDBR=0.58 and ODBR=0.37. In this case, the bus band utilization rate PDbb/PDMbb=0.9. In this case, the access efficiency to the external resource rather than the instruction execution speed in the main CPU determines the processing performance, and the bus band required to the real time bus system (data input/output throughput) is maximum. The bus band utilization rate PDbb/PDMbb may be considered to indicate how close the performance of the bus system is to the ideal one processor cycle. In the environment in which the bus is frequently used, the ideal bus state reduces and it is close to the ideal one processor cycle. From the above discussion, it is considered that the critical bus band utilization rate (the maximum effective bus band utilization rate) of the 32-bit processor system is approximately 0.9.

Figure 3:
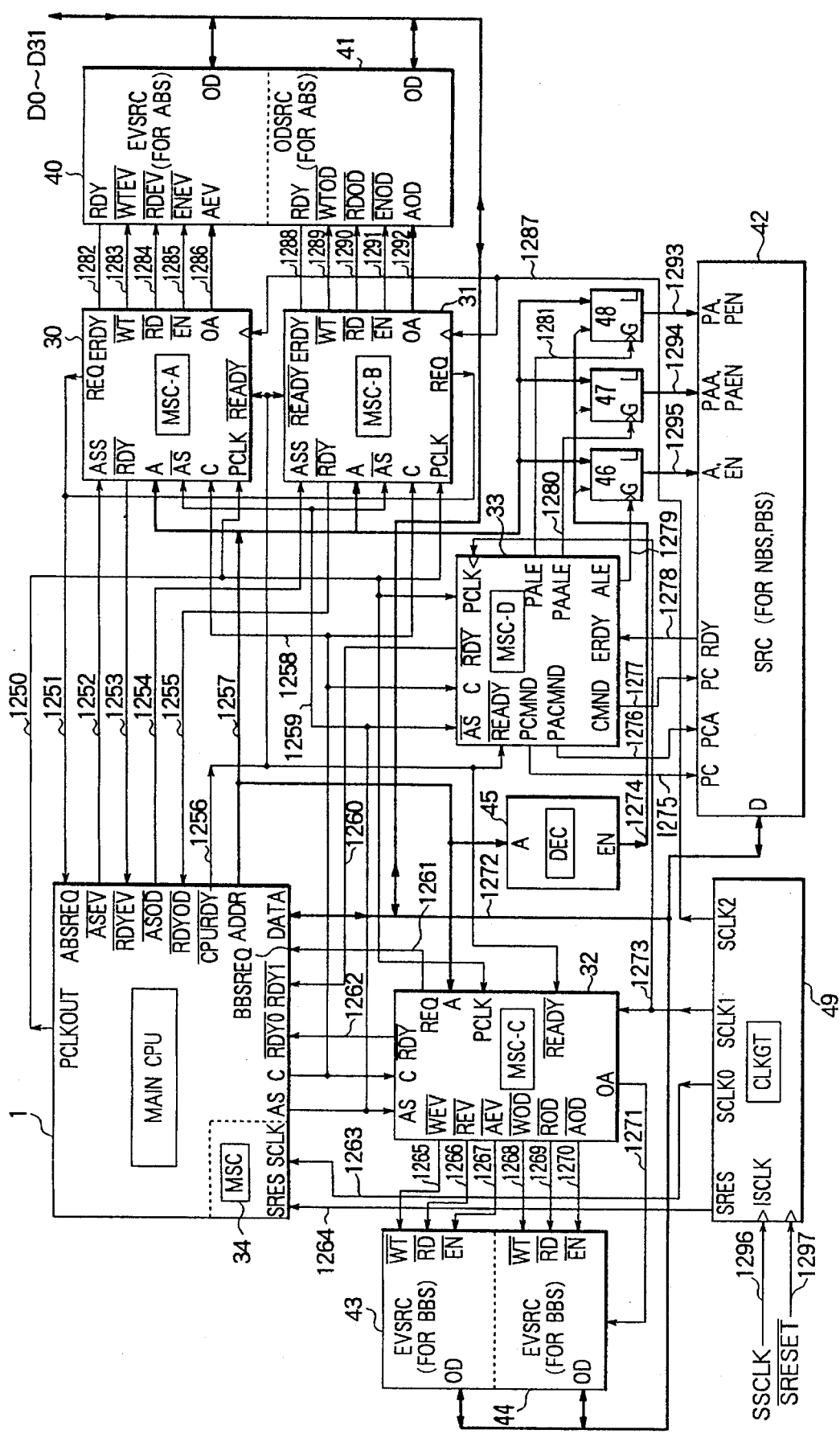
FIG. 3 shows a configuration of another embodiment of the processor system of the present invention.

FIG. 3 shows another embodiment of the processor system of the present invention, which is configured in a 32-bit real time bus/system. In FIG. 3, the like numerals to those in FIG. 1 designate the like elements. In the present embodiments, a plurality of machine state controllers (MSC, MSC-A~D) 30~34 are provided around the main CPU 1 to secure the access times to the resources, distribute the loads applied to the clocks and the control signals and manage the clock skew and the clock delay to realize a large scale synchronous high speed digital circuit.

The resources accessed from the main CPU 1 are divided into three major groups. They are the even resources (EVSRC) 40 and the odd resources (ODSRC) 41 accessed in the alternative bus state (ABS), the standard resources (SRC) 42 accessed in the normal bus state (NBS) or the pipeline bus state (PBS), and the even resources (EVSRC) 43 and the odd resource (ODSRC) 44 accessed in the burst bus state (BBS).

The independent machine controllers (MSC-A, MSC-B) 30 and 31 are connected to the even sources (EVSRC) 40 and the odd resources (ODSRC) 41 accessed in the alternative bus state (ABS). Those machine state controllers (MSC-A, MSC-B) 30 and 31 receive the signal ($\overline{ASEV}$) 1252 and the signal ($\overline{ASOD}$) 1254, respectively.

Accordingly, when viewed from the machine state controllers (MSC-A, MSC-B) 30 and 31 for the alternative bus state (ABS), the main CPU 1 appears as if it operates in the normal bus cycle (NBS) or the pipeline bus state (PBS) 42.

The machine state controllers (MSC-A, MSC-B) 30 and 31 supply to the corresponding source (EVSRC) 40 and resource (ODSRC) 41, respectively, the signals necessary for the resources for the addressing and the controls such as address signals (OA) 1286 and 1292, read commands ($\overline{RD}$) 1284 and 1290, write commands ($\overline{WT}$) 1283 and 1289, resource enable signals ($\overline{EN}$) 1285 and 1291, and signals indicating that the resources are being accessed.

As shown in FIGS. 3 and 4, in the machine state controllers (MSC-A, MSC-B) 30 and 31, the address enable signals (EALE, OALE) for generating the address signals (OA) 1286 and 1292 are generated from the corresponding address strobe signals ($\overline{ASEV}$) 1252 and address strobe signal ($\overline{ASOD}$) 1254. Of the address latch enable signals (ALE) shown in FIGS. 4 and 5, the address latch enable signals (EALE, OALE) are shown in FIG. 4 on the same time chart. Although they appear as the signals on the same signal line, the address latch enable signal (EALE) is generated by the machine state controller (MSC-A) 30 of the resource (EVSRC) 40 and the address latch enable signal (OALE) is generated by the machine state controller (MSC-B) 31 of the resource (ODSRC) 41. In the machine state controller (MSC-A) 30 of the resource (EVSRC) 40, the even address (AE) from the main CPU 1 is latched by the address latch enable (EALE) and the address is fixed to the address signal (OA) 1286 and it is outputted during the two processor clock (PCLK) period until the next address latch enable (EALE) is generated. The machine state controller (MSC-B) 31 of the resource (ODSRC) 41 also latches the odd address (AO) by the address latch enable (OALE) and fixes the address to the odd address (OA) 1292 for two processor clock period and outputs it. The resources send back the ready signals (RDY) 1282 and 1288 indicating that the access time is satisfied and the data input/output is ready, to the corresponding machine state controllers (MSC-A, MSC-B) 30 and 31. When the signals (ERDY) 1282 and 1288 are active, the machine state controllers (MSC-A, MSC-B) 30 and 31 render the ready signals ($\overline{RDY}$) 1253 and 1255 active to terminate the bus cycle of the main CPU 1.

As shown in FIGS. 3 and 4, in the alternative bus state (ABS), the active request signal (REQ) 1251 for the operation of the alternative bus state (ABS) is sent from the machine state controllers (MSC-A, MSC-B) for the alternative bus state (ABS) to the terminal (ABSREQ) of the main CPU 1. The main CPU 1 operates in the alternative bus state (ABS) mode until the terminal ABSREQ returns to nonactive. In this system, the information as to whether the machine state controller (MSC) of the resource is operable in the alternative bus state (ABS) mode or not can be provided to the main CPU 1 on a real time basis so that the main CPU 1 can dynamically change the access mode even if resources which operate in various access modes are present. Similarly, in the embodiment of the present invention, the machine state controller (MSC-C) 32 of the resource send back to the main CPU 1 the corresponding request (BBSREQ) 1261 for the burst bus request (BBS) to be described later.

In the present system, the resources which operate in the alternative bus state (ABS) mode are the main memory and the common system which occupy approximately 90% (including those operating in the burst bus state (BBS)) of the entire resource.

The access by the burst bus state (BBS) may be attained even with one machine state controller (MSC). Unlike the alternative bus state (ABS), the continuous addresses are accessed (rather than random access) in the burst bus state (BBS). Thus, it is only necessary to select the even source (EVSRC) 43 or the odd source (ODSRC) 44 by using the enable signal ($\overline{AEV}$) 1267 and the enable signal ($\overline{AOD}$) which indicate whether the even resource (EVSRC) 43 is to be selected or the odd resource (ODSRC) 44 is to be selected, the read command ($\overline{REV}$) 1266, the read command ($\overline{ROD}$) 1269, the write command ($\overline{WEV}$) 1265 and the write command ($\overline{WOD}$) 1268. Other address output information may be unified. Namely, the high order address information, the same address output (OA) 1271 may be used for the even resource (EVSRC) 43 and the odd resource (ODSRC) 44.

In the burst bus state (BBS), like in the alternative bus state (ABS), the machine state controller (MSC-C) 32 outputs the request signal (REQ) 1261 informing to the main CPU 1 that it operates in the burst bus state (BBS) mode in response to the access from the main CPU 1. The main CPU 1 receives the REQ signal 1261 at the terminal (BBSEREQ) to generate the bus cycle timing corresponding to the burst bus state (BBS) and accesses the resource.

The bus cycle is terminated by the send-back of the ready signal ($\overline{RDY}$) 1262 (the terminal ($\overline{RDY^0}$) of the main CPU 1) from the machine state controller (MSC-C) 32.

The normal bus cycle (NBS) and the pipeline bus state (PBS), which are common two-processor cycle buses, are used for the access to the general purpose I/O systems, the general purpose memory/storage systems and the system shared I/O buses. The bus band is approximately one half at maximum of that of the alternative bus state (ABS) or the burst bus state (BBS) (in the present system, 64M bytes/s when the processor clock (PCLK) frequency is 32 MHz) but it is advantageous in that the long access period is assured (particularly for the pipeline bus state (PBS)). When the resource having very high randomness is to be accessed, approximately 67% is secured relative to the alternative bus state (ABS) in the effective bus band width, which is much better than 50% compared with the maximum bus band width of the ABS.

As the general control signals/select signals outputted by the machine state controller (MSC-D) 33 to the resource (SRC) 42 to be accessed in the normal bus state (NBS) or the pipeline bus state (PBS), various commands (PCMND 1275, PACMND 1276, CMND 1277) for commanding the read and write of data, address signals for specifying addresses to be accessed in the SRC 42 and select signals (A, EN, PAA, PAEN, PA, PEN) of the source (SRC) 42. The machine state controller (MSC-D) 33 outputs the address latch enable signals (PALE 1281, PAALE 1280, ALE 1279) for latching (adjusting the signal inputted at the timing for the normal bus state (NBS) or the pipeline bus state (PBS) by a gate type flip-flop (GL)) by gate latches (BL) 46, 47 and 48 and outputting it) the address signal and the select signal (EN) 1274 decoded by the decoder (DEC) 45 from the address signal. The gate latches (GL) 46, 47 and 48 for the latching output the address signals and the select signals gated by the address latch enable signal to the source (SRC) 42.

The machine state controller (MSC-D) 33 for the normal bus state (NBS) and the pipeline bus state (PBS) receives the normal address strobe signal ($\overline{AS}$) 1259 from the main CPU 1 and generates the bus cycle timing corresponding to the normal bus cycle (NBS) and the pipeline bus state (PBS) shown in FIG. 4. The difference between the pipeline bus state (PBS) and the normal bus cycle (NBS) is, as shown in FIG. 4, that whether the address strobe signal ($\overline{AS}$) is active (PBS) or not (NBS) at the beginning of the bus state.

The bus state is terminated by the reception of the RDY signal 1278 by the machine state controller (MSC-D) 33 from the resource (SRC) 42 and the send-back of the ready signal ($\overline{RDY}$) 1260 by the machine state controller (MSC-D) 33 to the input terminal ($\overline{RDY}^1$) of the main CPU 1 at an appropriate timing in synchronism with the bus state and the processor clock (PCLK).

When the ready signals ($\overline{RDY}$) (($\overline{RDY}^0$ 1262, $\overline{RDY}^1$ 1260, $\overline{RDYEV}$ 1253, $\overline{RDYOD}$ 1255) are active, the final $\overline{CPURDY}$ signal 1256 is supplied to the terminals ($\overline{READY}$) of the machine state controllers (MSC-A~D) 31–34, and when the terminal ($\overline{READY}$) becomes active, the machine state controller (MSC) terminates the internal bus state. If the address strobe signal ($\overline{AS}$) is active at that time, the next bus cycle is automatically started in the pipeline bus state (PBS), and if the address strobe signal ($\overline{AS}$) is non-active, it is started in the normal bus state (NBS).

The ALE signal 1279 from the machine state controller (MSC-D) 33 is the address latch enable signal in the normal bus state (NBS) and it is generated by using the rising edge of the address strobe signal ($\overline{AS}$) after the start of the normal bus state (NBS).

Accordingly, the ALE signal becomes active with a slight delay to the strobe signal ($\overline{AS}$). The PALE signal 1281 is the address latch enable signal in the pipeline bus state (PBS) and it becomes active by using the active level of the pre-outputted address strobe signal ($\overline{AS}$) and the rise timing of the processor clock (PCLK) with ¼ processor clock (PCLK) delay from the start timing of the pipeline bus state (PBS). The PALE signal 1281 is used when it is desired to maintain the hold time of the address and select signals (A, PA, PAA, EN, PEN, PAEN) 1293, 1294 1295 to the source (SRC) 42 in the previous bus cycle and the data input/output (D) 1272.

The PAALE signal 1280 is the address latch enable signal in the pipeline bus state (PBS) and it becomes active substantially simultaneously with the start timing of the pipeline bus state (PBS) by using the active level of the pre-outputted address strobe signal ($\overline{AS}$) and the rise timing of the processor clock (PCLK) 1250. Where the hold time of the address and select signals to the resource (SRC) 42 and the data input/output is not very severe, the PAALE signal 1280 is used so that the bus cycle period (two processor clocks (PCL) period) is utilized at maximum to access the resource (SRC) 42. The output timing of the address latch enable signal in the normal bus cycle (NBS) and the pipeline bus state (PBS) is shown in FIG. 4.

In the alternative bus state (ABS) and the burst bus state (BBS), the 32-bit data input/output buses are prepared for the exchange of data with the resource (EVSRC) 40 and the resource (ODSRC) 41 to attain the bus band width which equivalently corresponds to the 64-bit bus. In the normal bus cycle (NBS) and the pipeline bus state (PBS), the resource (SRC) 42 may be accessed by the simple 32-bit data bus. Thus, the cost reduction and the standardization of the bus system may be easily done and the connection of the general purpose device may be easily done.

In the system shown in FIG. 3, the machine state controllers (MSC-A~D) 30–33 directly receive the basic system clock (SCLK0) 1263, the system clock (SCLK1) 1273 and the system clock (SCLK2) 1287 from the clock generation unit (CLKGT) 49. The clock generation unit (CLKGT) 49 outputs the system set signal (SRES) 1264 having a reset function for the system and a function to impart the timing to determine the phase of the processor clock (PCLK) to the SCLK. The system set signal (SRES) 1264 is outputted in synchronism with the system clock (SCLK) and supplied to the machine state controller (MSC) 34 in the main CPU 1.

In the machine state controller (MSC) 34 in the main CPU 1, the phase of the processor clock (PCLK) is determined by using the system clock (SCLK) from the clock generation unit (CLKGT) 49 and the rise timing (active transition timing) of the system set signal (SRES), and it is outputted to the terminal (PCLKOUT) 1250. The terminal (PCLKOUT) 1250 is connected to the processor clock (PCLK) inputs of other machine state controllers (MSC-A~D) 30–33. It is used to determine the phase relation of the system clock (SCLK) and the processor clock (PCLK) in the machine state controller (MSC).

By this synchronization method, the machine state controllers (MSC-A~D) 30–33 may internally generate processor clocks (PCLK) having the same phase, and when they are combined with the system clock (SCLK) from the clock generation unit (CLKGT) 49, the fine multi-phase clock control of ½ system clock (SCLK) unit is attained.

As described above, in the present embodiment, the bus cycles such as the alternative bus state (ABS), the burst bus state (BBS), the normal bus cycle (NBS) and the pipeline bus state (PBS) may be mixedly present. The normal bus cycle or bus state (NBS, PBS, BBS) is generated in the normal address strobe ($\overline{AS}$) 1259 and terminated by the ready signal ($\overline{READY}$) 1256.

On the other hand, in order to distinguish from the normal bus state (NBS) and the pipeline bus state (PBS), the alternative bus state (ABS) and the burst bus state (BBS) send the bus cycle requests (ABSREQ 1251, BBSREQ 1261) from the resource to the main CPU 1 to determine the bus cycle to be generated by the main CPU 1 to generate an appropriate bus cycle.

However, since which address space may be accessed in which bus cycle is determined when the system configuration (the allocation of the resources to the physical address space) is defined, it is not necessary to send the bus cycle identification information from the resource to the main CPU 1 if the resource allocation information is programmed in the main CPU 1.

Where the bus cycle identification is externally generated, it is necessary to decode the address information in the resource after it is externally generated by the main CPU 1. Thus, the delay time to send back the identification information to the main CPU 1 is large, and it is disadvantageous in terms of timing. On the other hand, if the main CPU 1 has the resource allocation information, it is possible to decode the address in parallel to the address generation stage (Addressing process) in the main CPU 1 and the appropriate bus cycle or bus state to be generated can be determined in advance at that time. Accordingly, the bus cycle generation may be controlled more efficiently.

The clock generation unit (CLKGT) 49 receives the basic system clock (SSCLK) 1296 which is the base of the operation of the overall system and the basic reset signal ($\overline{SRESET}$) 1297 and generates the system reset signal (SRES) 1264, the system clocks (SCLK0~2) 1263, 1273 and 1287 based thereon.

Where there are a plurality of main CPU's 1 or base processors (BP), the system clock generation unit (CLKGT) for generating the basic system clock (SSCLK) and the basic reset signal ($\overline{SRESET}$) is provided at the center and the basic reset signal ($\overline{SRESET}$) is synchronized with the basic system clock (SSCLK) and sent to the system clock generation units (CLKGT) of the respective processors.

In this manner, the basic reset signal ($\overline{SRESET}$) is synchronized with the system clock (SCLK) (generated by the basic system clock (SSCLK)) to generate the system set signals (SRES) having the same phase among the processors so that the processors may be operated by the processor clocks (PCLK) of the same phase.

The signal C 1258 outputted from the main CPU 1 and supplied to the machine state controller (MSC) is a signal (control signal) which transmits the control information. In particular, it serves to provide the operation state of the main CPU 1 and the status information of the bus cycle to the external of the main CPU 1. For example, it informs whether the bus cycle currently operating or the bus cycle or the bus state to be next generated is a read cycle, an instruction fetch cycle or data fetch cycle, or a special bus cycle such as an interrupt cycle or halt cycle.

The main CPU 1 outputs the address (ADDR) 1257 and the address strobe ($\overline{AS}$) 1259 to the external in the addressing stage of the internal pipeline. Accordingly, the bus states of the machine state controllers (MSC-A~D) 30~33 may be generated in parallel to the succeeding operation execution stage of the main CPU 1. Namely, when viewed from the main CPU 1, it is observed as if the pipeline stage proceeds in parallel (parallel pipelining) distributedly in the internal (operation execution) and the external (the access of the external resource by the bus state). The internal operation in the main CPU 1 will be explained later.

In the real time bus system, the accessing of the external resource by the bus cycle is completely integrated with the pipelining in the main CPU 1 (equivalent to built in the pipeline) to reduce the latency of the accessing and improve the real time performance.

In the present embodiment, as described above, the information as to which access mode (ABS, BBS, NBS, PBS mode) permits the accessing of the resource by the machine state controller (MSC) of the resource (in the present embodiment, the bus cycle requests ABSREQ, BBSREQ) is sent back to the main CPU.

Thus, even if the resources of different access modes are mixedly present, the main CPU 1 dynamically generates the bus cycle in the appropriate access mode so that the data processing throughput of the entire system is improved. In the present embodiment, the resource is provided with the function to inform the main CPU 1 of the access mode. Where the allocation of the external resources is determined by the physical addresses generated by the main CPU 1 to the external, the physical addresses may be decoded in the main CPU 1 so that the function to pre-determine the allocated resources may be provided in the main CPU. Namely, the memory means for storing the program to determine which access mode (for example, the alternative bus state (ABS) mode) the resource allocated to the specific area of the physical address responds to may be provided in the main CPU 1, and means for comparing the programmed allocation information and the physical address to be generated in the addressing in the main CPU 1 may be provided. In the execution of the bus cycle, the access mode is determined before the address is outputted.

Thus, the machine state controller (MSC) for managing and generating the bus cycle in the main CPU 1 may directly determine the necessary access mode and generate the corresponding bus cycle. In this method, the time to decode the physical address in the resource, the delay time before the send-back of the request signal to designate the access mode (in the present embodiment, ABSREQ or BBSREQ) to the main CPU 1 and the overhead of the main CPU 1 for the synchronization and acquisition are eliminated so that the shift to the desired access mode is attained faster.

The bus states (NBS, PBS, BBS, ABS) described above may be considered equivalent to the bus cycle supported by the real time bus system. When described simply as bus cycle hereinafter in the real time bus system, it means the access bus cycle to the external resource based on one of the NBS, PBS, BBS and ABS, and when described simply as bus state, it means the basic unit of the bus cycle, that is, in the present embodiment, the processor cycle (1 PCLK period).

Figure 5:
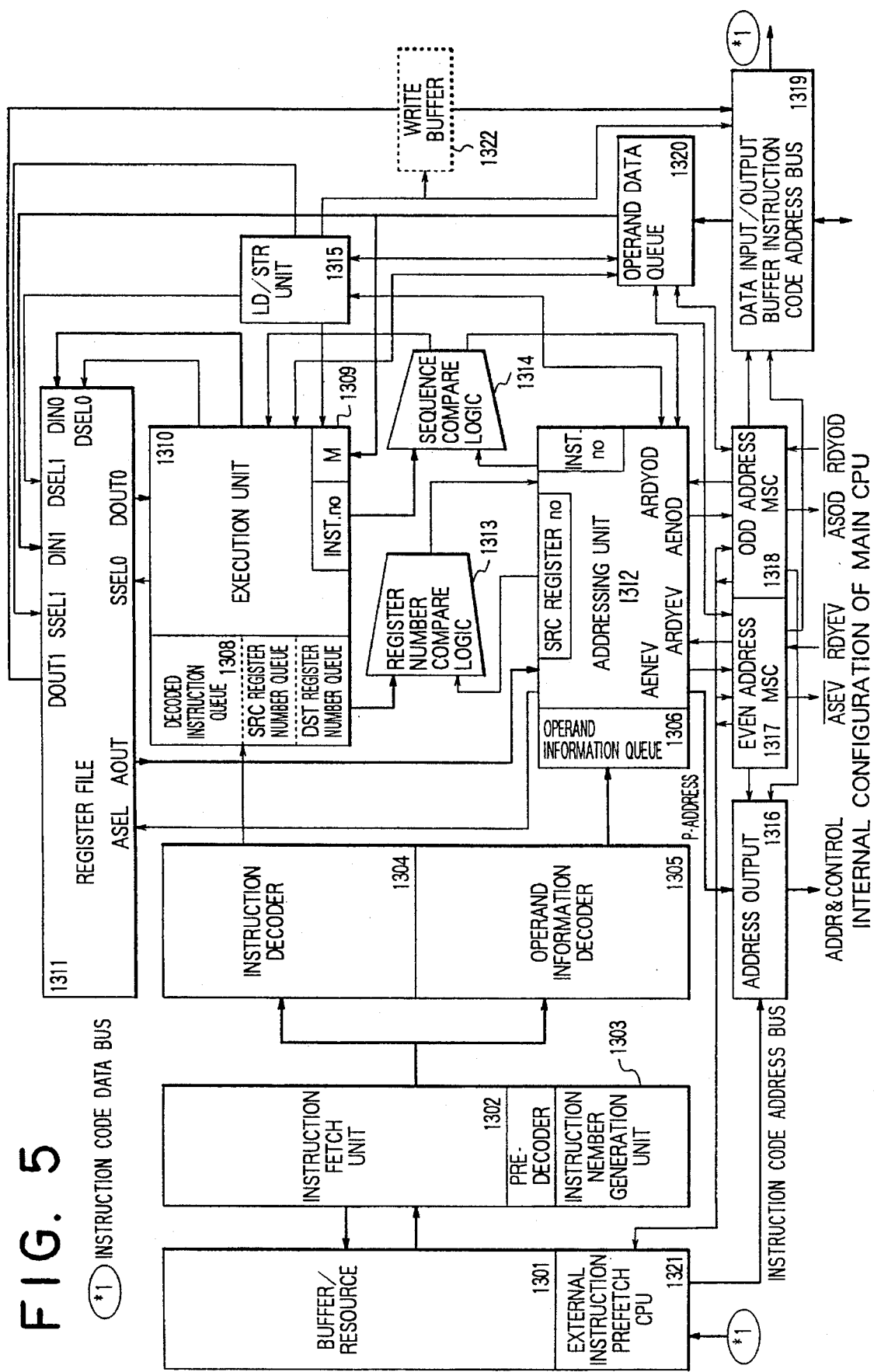
FIG. 5 shows a configuration of a main CPU of the processor system of the present invention.

A configuration of the processing unit of the main CPU 1 is shown in FIG. 5. The processing unit of the main CPU 1 includes all means necessary to support the real time bus architecture and the real time bus protocol. In the example of the processing unit of the main CPU 1 shown in FIG. 5, it is assumed that an instruction data resource 1301 is inputted to the processing unit from a separate path from that of the operand data resource (which is referred to as the external resource) and it is represented in a simplified form. Locations in which the instruction data are actually present may be a program memory (including a cache memory) in the processing unit and the external instruction data memory coupled through a separate instruction data input/output path. In any case, means for inputting and outputting the instruction data and the operand data to the processing unit in parallel is provided for the parallel processing.

The processing unit in the main CPU comprises an instruction fetch unit 1302 for fetching the instruction from the instruction data resource 1301, an instruction number generation logic 1303 for imparting an instruction number to the fetched instruction, an instruction decode unit 1304 for decoding the instruction, an operand decode unit 1305 for decoding the operand, a decoded instruction queue 1308 for converting the decoded instruction to an executable form and storing it time-sequentially together with the numbers of a source register of a destination register which stores the processed result, an operand information queue 1306 for converting operand information to an addressable form and time-serially storing it, an execution unit 1310 for reading an instruction from the decoded instruction queue 1308 and executing it, an addressing unit 1312 for reading operand information from the operand information queue 1306 and executing the addressing based thereon, a register file 1311 for storing a source or destination register which designates the execution unit 1310 as an item to be processed, and a bus control unit (a LD/STR unit 1315, an address output buffer 1316, an even address MSC 1317, an odd address MSC 1318, a data input/output buffer 1319 and an operand data queue 1320) for controlling the input and output of the operand data to the external resource (actually driving the real time bus system and inputting and outputting to the internal processing unit) based on the addressing information from the addressing unit 1312.

Significant differences from the prior art processing unit (CPU) are that the instruction fetch unit 1302 has the pre-decode function and recognizes the break between the instructions, and the instruction number generation logic 1303 assigns the instruction number in the order of processing of the instructions, and the two decode units of the operand decode unit 1305 cooperate to parallelly decode the instructions.

The assigned instruction number is used as the control information to prevent the processing sequence from being disordered as a whole. The instruction decode unit 1304 selects and analyzes only the instructions to be executed in the execution unit 1310, converts them to the executable instruction codes and sends them to the decoded instruction queue 1308. The analyzed instruction codes sent to the decoded instruction queue 1308 include the instruction number, and the operation instruction and the data processing instruction, primarily consisting of the instructions for the register excluding the simple load/store instruction (the instruction to move data between the external and the main CPU) are selected and stored.

On the other hand, in the operand decode unit 1305, only the instructions which are to be accessed to the external resource through the bus system are selected as the load instruction and the store instruction, and the attribute representing the load or the store and the address generation information and the instruction number in which the operand data is present are sent to the operand information queue 1306 as the operand information. The load/store instructions selected and decoded thereby include inherently simple ones (the instruction for simply moving the data between the external and the main CPU) and the load/store processes extracted from the instructions for operating the external data or processing the data (the other operation process and data processing process are analyzed by the instruction decode unit and executed by the execution unit).

In any case, it is converted to a unit which can be equally handled in a level of the move of data between the external and the main CPU. The addressing unit 1312 receives the information of the operand information queue 1306 which addresses the calculation of the physical address present in the operand data from the address information relating to the operand data and generates the load/store control signal for executing the load/store instruction. Namely, the load/store instruction which has been executed in the processing unit in the prior art is executed in the present invention by the cooperation of the addressing unit 1312 and the bus control units 1315~1320 including the load/store unit in parallel with the execution unit 1310 to improve the overall process efficiency.

The parallel operation of the execution unit 1310 and the addressing unit 1312 and the bus control units 1315~1320 is now explained in detail.

As described above, the information on the load/store instruction sent from the operand information queue 1306 to the addressing unit 1312 includes two types, one being a simple inherent load/store instruction and the other being a load/store processing for handling one source processed by the execution unit 1310 or one destination data.

The load/store processing is executed by cooperation of the addressing unit 1312, the load/store processing unit (LD/STR unit) 1315 and the bus control units 1316~1320, and there is little need to distinguish the process contents of the two types of load/store processing. Actually, however, in the latter load/store instruction, one inherent instruction, that is, an instruction accompanied by the data access to the external resource, is cooperatively executed by the execution unit 1310 and the addressing unit 1312.

Accordingly, in the instruction which uses the data from the external resource in the execution unit 1310 (the instruction which is accompanied by the loading of the data from the external resource to the main CPU), if the loading in the addressing unit 1312 and the load/store unit 1315 is delayed from the execution of the corresponding instruction in the execution unit 1310, the execution unit 1310 cannot process the target data until the loading is completed and the data from the resource is available to the execution unit 1310.

On the other hand, if the execution of the instruction in the execution unit 1310 is delayed from the loading in the addressing unit 1312, the loading accompanying the instruction has been completed when the execution unit executes the instruction and the desired data has been entered in the external data memory (m) 1309 through the data buffer 1319 and the operand data queue 1320.

Accordingly, the execution unit may execute the intended process by using the data M and it need not wait. This interlocked processing is attained by providing a sequence compare logic 1314 between the addressing unit 1312 and the execution unit 1310 to manage the progress status of the instruction execution between the units.

The instruction number generated by the instruction number generation logic 1303 is transferred to the units together with the instruction execution information and it finally reaches the execution unit 1310 and the addressing unit 1312. The sequence compare logic 1314 compares the instruction numbers being executed in the two units to determined the priority of the instruction execution.

When the addressing unit 1312 conducts the storing for the external resource (in the present embodiment, the move of data to the register file external resource in the main CPU is defined as the storing), it is necessary that the data (source data) on the register file 1311 to be stored be consistently defined to the processing sequence. To this end, the instruction number a of the instruction to be stored is smaller than the instruction number e of the instruction currently executed in the execution unit 1310 (a<e; the processing in the execution unit 1310 is in advance of the processing in the addressing unit), or when a≧e, the destination registers for the instructions corresponding to the instructions e~a (excluding non-existing instruction) stored in the decode instruction queue 1308 are not identical to the source register for the storing executed in the addressing unit 1312.

Namely, when the execution unit executes the instructions e~a and if there is no possibility of updating the source register for the storing, the storing processing unit 1315 may arbitrarily read data from the register file and output it to the external resource through the data input/output buffer 1319.

So long as the above condition is met, the addressing unit 1312, and the bus control units 1316–1320 including the load/store unit 1315, may be operated in parallel with the operation of the execution unit 1310. In this case, the instruction numbers are compared by the sequence compare logic 1314 to attain necessary interlocked processing.

The check between the destination registers and the source registers is attained by providing a register number compare logic 1313 for comparing the content of the destination register queue in the decoded instruction queue 1308 (the register number of the register for storing the process result of the execution unit is stored in the queue in the form corresponding to the instructions in the queue) and the source register number used in the addressing unit (it is used as the source register in the storing process).

The address output buffer 1316 in the bus control unit has a function of storing the physical address from the addressing unit and outputting the address signals and the control signals which are time-serially stored to the external in synchronism with the bus control signal such as the address strobe signals ($\overline{\text{ASEV}}$, $\overline{\text{ASOD}}$) generated by the even address machine state controller (MSC) 1317 and the odd address machine state controller (MSC) 1318. The output timing of the addresses follows the bus cycle protocol shown in FIGS. 2 and 4.

The addressing unit 1312 supplies the physical address information (P-Address) to the MSC 1317, the MSC 1318 and the address output buffer 1316, and when it is received, it receives the active address ready signal (RARDY) from the MSC's 1317 and 1318 and starts the outputting of the next address information. If the calculation of the valid address information to be next outputted is not completed in the addressing unit 1312, the outputting of the address information is conducted immediately after the completion of the calculation. As to whether the address information outputted from the addressing unit 1312 is valid or invalid, the active levels of the address enable signals AENEV (for the even address) and AENDO (for the odd address) are detected by the MSC's 1317 and 1318 to determine the validity of the address information. In order to terminate the bus cycle to the external resource at an appropriate time after the MSC's have outputted the address strobe signals ($\overline{\text{ASEV}}$, $\overline{\text{ASOD}}$) to the external and started the bus cycle, it is necessary to receive the active ready signals ($\overline{\text{RDYEV}}$, $\overline{\text{RDYOD}}$) corresponding to the bus termination permit signal from the external resource (the ready signal is not necessary if the bus cycle period is always constant). The address strobe signal ($\overline{\text{AS}}$) is generated, and the MSC which has started the bus cycle is permitted to terminate the bus cycle at the last bus state in which the ready signal ($\overline{\text{RDY}}$) is active and start the next bus cycle from the beginning of the next bus state. As shown in FIG. 5, when the bus cycle is allotted to the two types of addresses, even and odd addresses, it is usually determined by whether the least significant bit of the physical address is 1 (odd) or 0 (even). Instead of the least significant bit, any one bit in the address may be used as the determination bit depending on the purpose so that the alternative bus cycle (ABS) of high speed (the overhead in the determination process is minimum) can be attained in the easiest way in the system which uses two address strobe signals.

An embodiment of the alternative bus state (ABS) allotted to more bus cycles by generating more address strobe signals will be described later in detail.

The data input/output buffer 1319 inputs and outputs data from and to the external in accordance with the bus cycle protocol shown in FIGS. 2 and 4 by using the sync signals and bus command signals (signals to define the active period of the bus cycle, data input timing and data output timing) from the machine state controllers 1317 and 1318.

The input data is stored in the operand queue 1320 and it is written (data loading) in the register of the register file 1311 or the operand memory (M) 1309 in the execution unit 1310 by the load/store unit 1315 at an appropriate timing. When the data is written in the register file or M, the operand data queue 1320 outputs the next stored data by the instruction from the load/store unit 1315, or if there is no stored data, it sends back the empty information to the load/store unit 1315. If the load/store unit 1315 has started the writing of the data to the register file when the data input/output buffer 1319 fetches the data from the external, the fetched input data is transmitted through the operand data queue 1320 and reaches the register file 1311 or the operand memory 1309 and it is written therein by the load/store unit 1315. This is called a bus mode. If the operand data queue 1320 is empty (which is informed by the empty information from the operand data queue 1320) when the load/store unit 1315 is to fetch the data from the operand data queue 1320, the load/store unit 1315 waits until the input data is passed from the data input/output buffer 1319.

When the data is to be outputted to the external, the load/store unit 1315 reads the data from the register of the register file 1311, delivers it to the data output buffer 1319 and informs that the output data is active.

A write buffer 1312 may be provided between the register file 1311 and the data input/output buffer 1319 to temporarily store the data read from the register file 1311, and when the condition to output the data to the external is met, the data may be read from the write buffer 1312 and outputted to the external. In this case, like the case of the operand data queue 1320, a pass mode may be provided to reduce the latency in outputting the data.

The load/store unit 1315 operates in accordance with the instruction from the addressing unit 1312. Namely, when the external inputting/outputting takes place, the addressing unit 1312 calculate the address and generates the bus cycle, and indicates the register number to be inputted or outputted (DSEL1: destination register number, SSEL1: source register number) or the operand memory 1319 to the load/store unit 1315 when the input/output of the data from and to the register file 1311 is ready, based on the information of the register number compare logic 1313 and the sequence compare logic 1314. In response thereto, the load/store unit 1315 generates the necessary data input/output sequence.

The register file 1311 may be parallelly accessed from the three units, the addressing unit 1312, the execution unit 1310 and the load/store unit 1315. The addressing unit 1312 designates by the register number (ASEL) the base register and the index register to be used for the addressing of its own and produces the output AOUT by reading the register.

The execution unit 1310 designates the register to be processed by the register number (SSEL0) as the source register, and designates the register to store the result data by the register number (DSEL0) as the destination register. The execution unit 1310 reads the source data from the DOUT0 output corresponding to the register number (SSEL0), processes it, and stores the process result in the register designated by the DSEL0 through the DIN0 input. The load/store unit 1315 reads the content of the source data to be stored from the DOUT1 output by the register number (SSEL1) and writes the data to be loaded to the destination register to be loaded selected by DSEL1 through DIN1.

Figure 6:
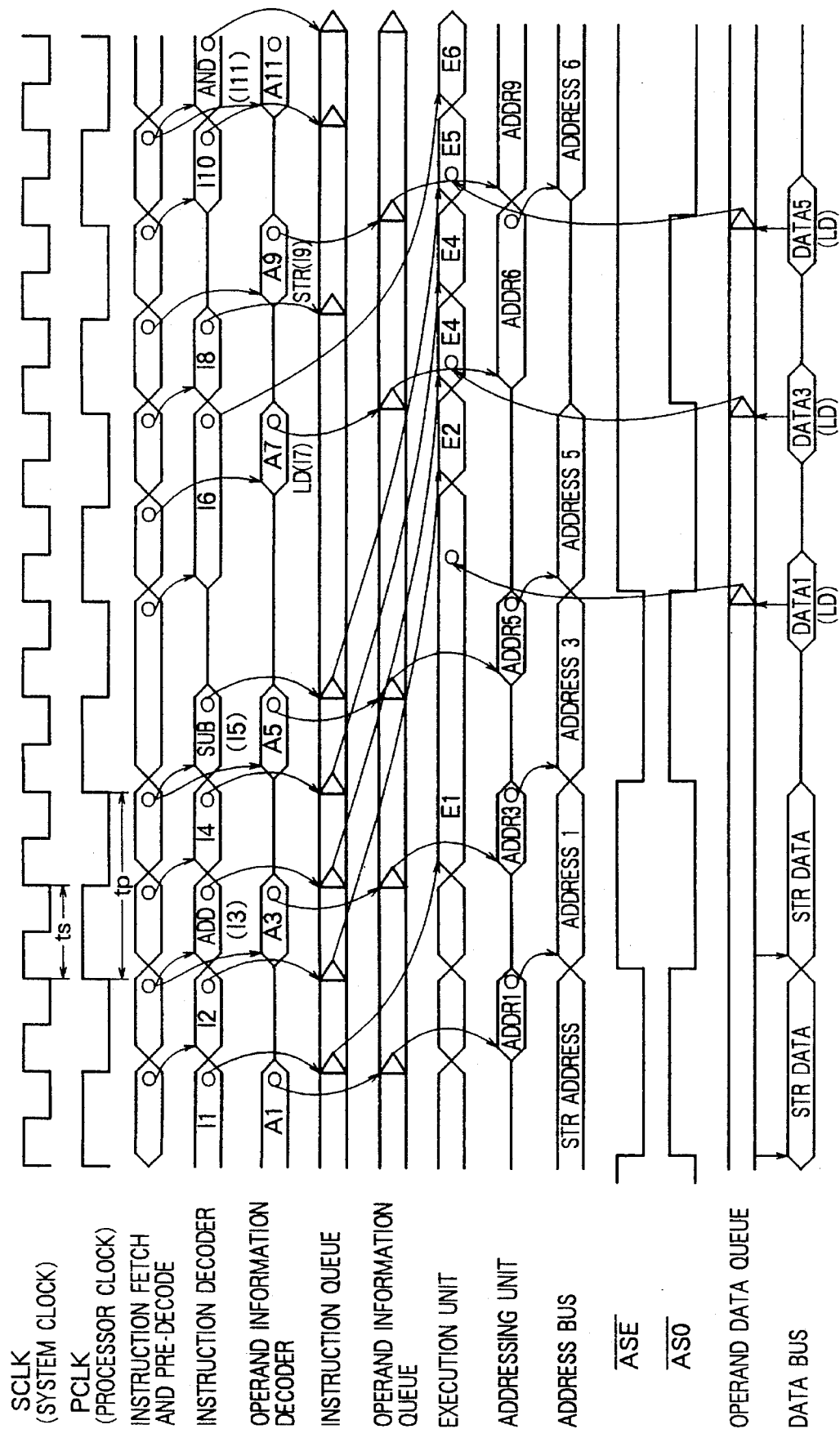
FIG. 6 shows a timing chart of an operational timing cycle of the main CPU shown in FIG. 5, FIGS. 7 and 8 show timing charts for illustrating interlock control between bus cycles in an alternative bus state (ABS)

FIG. 6 shows an operation sequence in the main CPU shown in FIG. 5.

As a reference clock, SCLK (period ts), which is the system basic clock, and the processor clock (PCLK), synchronized with the system basic clock (SCLK) and having the double period (tp), are provided. The instruction fetch and pre-decoders 1302 and 1303, the instruction decoder 1304, the operand information decoder 1305, the instruction queue 1308, the operand information queue 1306, the execution unit 1310 and the addressing unit 1312 operate by the period (ts) of the system basic clock (SCLK).

The execution unit 1310 executes a simple instruction (add, subtract, logical operation) in one system clock (SCLK) unit, and executes other complex instruction in n system basic clock (SCLK) units.

The addressing unit 1312 basically generates the address in the system basic clock (SCLK) unit. Simple addressing (for example, one or two add/subtract cycles for the addressing) may be executed in one system basic clock (SCLK), but complex addressing (for example, three or more add/subtract cycles are included or multiplication is included) takes 11 system basic clock (SCLK) cycles. The basic cycle of the bus cycle is PCLK, as described above.

Since most addressing is completed in one or two add/subtract cycles, it may be linked to other units (directly the operand information queue) which operate in the system basic clock (SCLK) unit to address based on the information derived therefrom so that it is executed at a faster timing than the process to output the final address to the bus cycle.

Accordingly, the time to derive the data from the external resource is faster and the possibility of waiting on the execution unit for the necessary data is lowered.

As seen from FIG. 6, in accordance with the present invention, the process is divided into two process streams (an operation or process stream processed by the execution unit 1310 for the register file 1311 or the operand memory 1309, and an access stream to the external by the addressing unit 1312 and the load.store unit 1315) in the levels of the instruction decoder and the operand information decoder so that the subsequent processing is executed in parallel. The addressing is pre-executed at the timing described above, and the data accessing to the external resource (the bus cycle operation by the alternative bus cycle (ABS) mode) is attained by the even address machine state controller 1317 and the odd address machine state controller 1318 at the highest processor clock (PCLK) cycle in synchronism with the two address strobes ($\overline{ASEV}$, $\overline{ASOD}$).

On the other hand, the processing in the execution unit 1310 is conducted in the minimum system basic clock (SCLK) period (ts), that is, in ½ system basic clock (PCLK) period. Since the instruction with the external access is usually ½–⅓ of the previous instruction, the speeds of the accessing of the external data and the processing in the execution unit are maintained substantially optimum (ideally, the processing speeds of the two process streams are substantially equal or the accessing of the external data is slightly in advancement).

The conflict control of the read cycle (LD process) and the write cycle (STR process) in the bus control system and the improvement of the efficiency thereof are explained with reference to FIGS. 5 and 6.

A typical cause for the reduction of the process efficiency is the data wait overhead in the execution unit by the interlock operation between the input process (LD) of necessary data and the operation (e1) of the data in the execution unit 1310. This also occurs in the load (LD) process of Data1 in FIG. 6. Namely, the process efficiency of the main CPU is lowered because the necessary data is not inputted from the external, and the execution unit 1310 must wait. In the example of FIG. 6, the Data1 is available in the execution unit 1310 three system clocks (3×SCLK period=1.5×PCLK period) after the start of E1 in the execution unit 1310. Thus, the execution unit 1310 cannot conduct the necessary processing with the Data1 and has to wait until that time. Analyzing more particularly, two store processes are executed prior to the load (LD) process of the Data1, and it is seen that if it may be postponed, the operation of the execution unit 1310 may not be impeded and the process may be preceded. In order to prevent the reduction of the efficiency of the execution unit 1310 by the conflict of the read cycle (LD process) and the write cycle (STR process) and the waiting of the read cycle, it is effective to provide a function in the addressing unit 1312 which replaces the sequence to output the physical address used for the load (LD) process and the sequence to output the physical address used for the store (STR) process so that the physical address to be used for the load process is outputted in advance. A case in which the load process is substantially delayed by the preceding store process is analyzed in detail below.

(1) The designation of the sequence of the instruction codes by a user who describes the program generates a sequence in which the store instructions unduly precede, and it causes postponing of the load process.

(2) Before the result data is sent back from the execution unit 1310 to the desired register, the execution of the store instruction to store the result data from the register to the external is started, and the bus cycle is frozen until the desired result data is sent back to the register, and the store process cannot be completed. Thus, the load instruction to be next executed is delayed, and the execution unit 1310 which executes by using the external data by the load process has to wait the processing.

As to (1), the load instruction and the store instruction are replaced within the range which does not cause contradiction in the object code in the compiler level and the object code file is reedited such that the store instruction is postponed to the point at which the storing of the result data on the external resource is absolutely required. When a function which attains the same level of effect is to be provided with the hardware in the main CPU shown in FIG. 5, some or all of the following mechanisms ar to be provided in the addressing unit 1312 or the LD/STR unit 1315.

a) If the physical address corresponding to the load instruction processing to be next executed (if there is a next load instruction) differs from the physical address corresponding to the store instruction processing when the addressing unit 1312 starts the calculation of the physical address corresponding to the store instruction processing, the outputting of the physical address corresponding to the load instruction processing is preferentially executed, and otherwise the outputting of the physical addresses in the order of instruction number is executed. Further, the instruction number under the execution in the execution unit 1310 and the instruction number corresponding to the store instruction in the addressing unit 1312 are compared in the sequence compare logic 1314, and if delay of the operation of the execution unit 1310 from the operation of the addressing unit 1312 is within a predetermined level or the execution unit is in advancement, the outputting of the physical address corresponding to the load instruction to be next executed is preferentially executed so that the storing process is not unduly postponed. By providing two or more operation circuits for calculating the physical address in the addressing unit 1312 to parallelly execute the two address calculation processes or executing the calculation of the next physical address by using the idle time of the addressing process (for example, one SCLK period between ADDR1 and ADDR3) as shown in FIG. 6, the address for the next load instruction may be designated at an earlier timing. In the example of FIG. 6, the address calculation may be executed in one SCLK period (equivalent to the basic operation process time of the execution unit 1310) so long as compiles address calculation is not executed as represented by ADDR6 or ADDR9 so that the calculation of the next address is proceeded with in most cases. In order to proceed the parallel address calculation, it is necessary to proceed with the decoding of the operand information at a high speed. Accordingly, it is desirable to shorten the process cycle of the decoding (for example, ½ SCLK period) so that the operand information may be generated in advance.

b) A mechanism is provided in the addressing unit 1312 and the LD/STR unit 1315 such that when the store instruction is to be executed but the result data has not been sent back from the execution unit 1310 to the register and the string process is frozen, the load instruction processing or store instruction processing to be next executed is executed in advance if the physical address corresponding to the store processing and the load instruction processing or store instruction processing to be next executed are different, and the frozen storing process is executed after the result data is sent back. The parallel calculation of the address and the advanced calculation of address are identical to those of a).

c) Apart from a) and b), a physical address queue for storing a plurality of calculated physical addresses in advance is provided in the addressing unit 1310, and a function to replace the content of the queue is provided in the addressing unit 1310 such that the content of the queue is checked and the physical address corresponding to the store instruction contained therein is compared with the physical address corresponding to the load instruction, and if they are different, the physical address corresponding to the load instruction is outputted in advance. In this case, the address calculation and the decoding are to be executed in advance as fast as possible.

In this manner, the processing efficiency of the main CPU is improved by replacing the process sequence of the load process and the store process but it may cause a problem in certain cases. For example, in many I/O processes, the bus cycle is used for switching or command generation. Since they are procedure processes, the sequence to switch or generate the command is critical. In those procedure processes, the technique to replace the generation sequence of the bus cycle cannot be used. In the external resource such as a shared memory which may be read by another processor, the storing of the information on the external resource is preferentially executed, and it is not always wise to load the information preferentially to the storing and postpone the storing. Accordingly, the improvement of the efficiency of the main CPU by this technique may be generally applied to only the local memory. A register for defining the address space to attain the improvement of the efficiency by the technique to replace the bus cycle so that the load instruction is preferentially executed if the access to the address space (for example, a space having a local memory allotted thereto) occurs in the addressing unit 1312 as well, and a circuit for detecting the occurrence of the access to the space by comparing the register (with the physical address to be generated).

Figure 7:
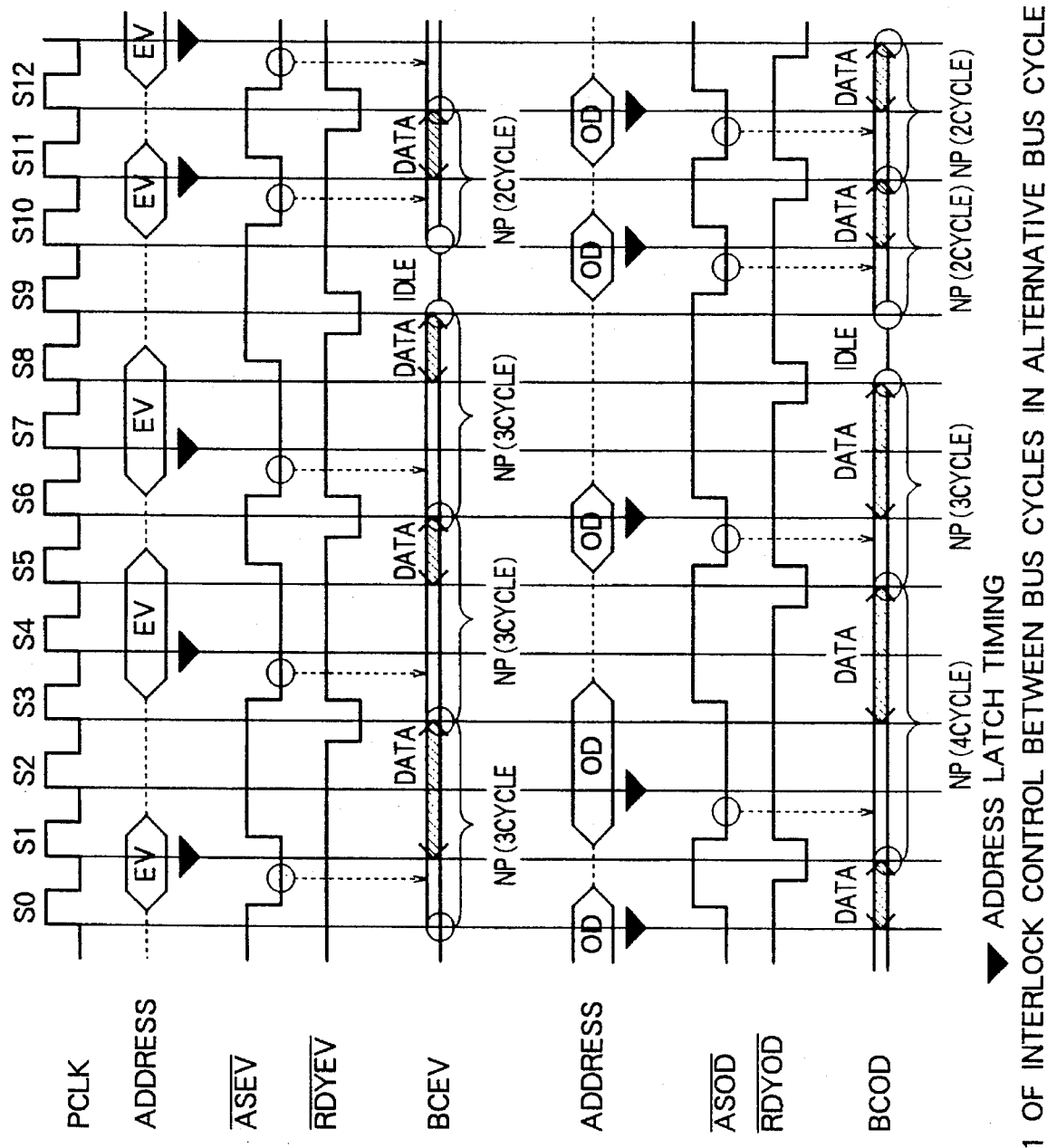
Figure 8:
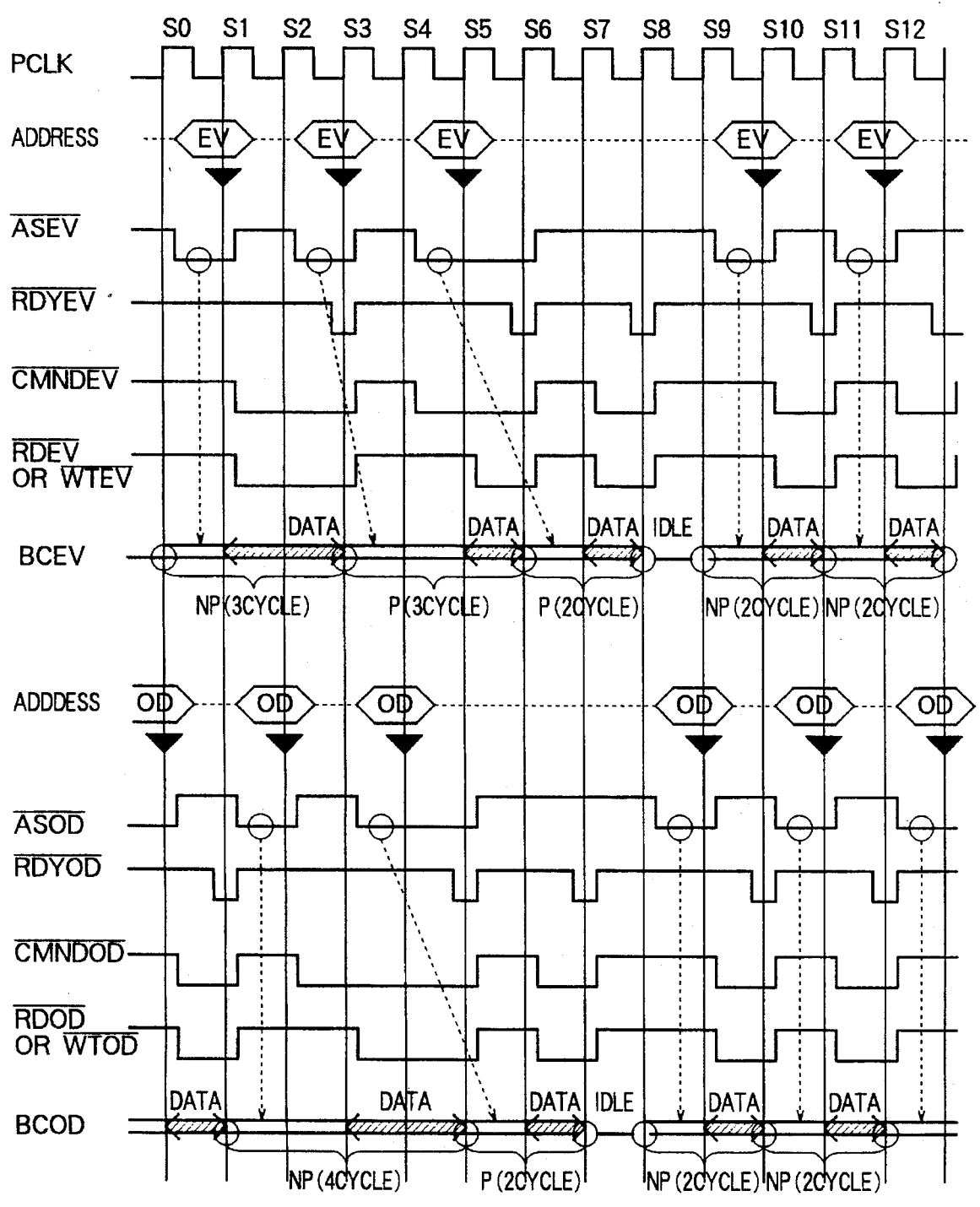

Referring to FIGS. 7 and 8, the interlock control between the bus cycles in the alternative bus state (ABS) is explained in detail. The interlock control between the bus cycles is required because a) since the bus cycles are generated in overlap in the ABS, it is necessary to control the timing of the read and write period in non-overlapped manner when valid data read and write is to be executed on only one data bus, and b) it is necessary to control the sequence of the input and output data without contradiction in accordance with the sequence of generation of the bus cycle.

In the illustrated timing of FIG. 7, the interlock control of the bus cycle is effected by expanding the active level period of the address strobe signals ($\overline{ASEV}$, $\overline{ASOD}$) when the preceding bus cycle is not completed to inform it to the MSC's 30 and 31 for controlling the external resource. Basically, the main CPU effects the interlock control, and the information is transmitted to the external by using only the address strobe signal ($\overline{AS}$) so that the number of signal lines is reduced. There is no need to communicate signals between the MSC's 30 and 31 and the independence of the MSC's is high. The example shown in FIG. 3 (the unit comprising MSC-A 30, MSC-B 31, EVSRC 40, ODSRC 41) adopts the present method. The detail of the timing control is explained with reference to FIG. 7.

In the non-wait mode, the bus cycle of the alternative bus state (ABS) comprises two bus state (2×PCLK period), and so long as the wait state is not inserted, the cycle steal like control which does not require special interlock control may be attained so long as the overlap control between the bus cycles is conducted by using a plurality of address strobe signals, and the access cycle of substantially one bus state (1×PCLK) is attained. However, when the external resource cannot be accessed in two bus states, the ready signal ($\overline{RDY}$) is rendered active with the delay of necessary number of bus states to insert the bus cycle in the wait state. Accordingly, the next bus cycle which is executed in overlap with the current bus cycle having the wait state inserted cannot execute the inputting and outputting of the necessary data until the current bus cycle is completed. Accordingly, it is necessary to delay the completion of the bus cycle to at least one bus state (which corresponds to 1 PCLK period during which the inputting and outputting of the data in the next bus cycle is executed) from the bus state in which the inputting and outputting of the data by the current bus cycle is completed.

In the example of FIG. 7, the bus cycle in the ABS is executed in the non-pipeline cycle (NP). It may be considered that the bus cycles which are timingwise equivalent to the normal bus state (NBS) are alternately executed. In the bus states S0~S12, the address strobes corresponding to the bus cycles of the even addresses are generated in S0, S3, S6, S10 and S12, and the bus cycles of the odd addresses are generated in S1, S5, S9 and S11. It is assumed that the bus cycles started at S0 and S5 require three cycles (3 bus states=3×PCLK period), and the bus cycle started at S1 requires four cycles (4 bus states=4×PCLK period). The actually executed bus cycles are designated by BCEV (even bus cycle) and BCOD (odd bus cycle). Since the odd bus cycle started at S1 requires four processor cycles of bus states, the even bus cycle which is started at S3 and is to terminate in two processor cycles is affected so that the $\overline{RDYEV}$ signal is rendered active with the delay of one processor cycle and the bus cycle is expanded. In the present embodiment, in order to indicate that the current bus cycle is affected by the non-completion of the preceding bus cycle, the main CPU maintains the address strobe signal of the current bus cycle active (Lo level) until the preceding bus cycle is completed. It is seen that the address strobe signal $\overline{ASEV}$ which is active at S3 is maintained active until the odd bus cycle started at S1 is completed (until the end of the S4 state at which $\overline{RDYOD}$ is sent back). The machine state controllers 30 and 31 determine this condition to control the RD (output enable) signal and the WT (write) signal. Namely, the timing to output the valid data to the data bus from the external resource is that which is in the corresponding read bus cycle and in which the corresponding address strobe signal is non-active (in the present example, the bus state S5). Similarly, in the even bus cycle started at S6, $\overline{\text{ASEV}}$ is expanded by the affect of the odd bus cycle started at S5 so that $\overline{\text{RDYEV}}$ becomes active at the beginning of S8 at which $\overline{\text{ASEV}}$ becomes non-active, that is, the inputting and outputting of the valid data are effected during the bus state S8. The address signal to the external resource is latched by the MSC at the address latch timing shown in FIG. 7 and it is maintained valid to the external resource for at least the period from the beginning of the bus cycle to the end of the bus cycle. In the example of FIG. 7, the bus cycle is executed in the non-pipeline (NP) addressing mode. Namely, after the preceding bus cycle is completed, the next bus cycle is started, and when the address strobe signals ($\overline{\text{ASEV}}$, $\overline{\text{ASOD}}$) become active, the bus cycle is started and it is terminated when the corresponding ready signals ($\overline{\text{RDYEV}}$, $\overline{\text{RDYOD}}$) become active. Accordingly, as shown by arrows in the figure, the address strobe signals and the bus cycles operate in directly corresponding timing relation.

Figure 9:
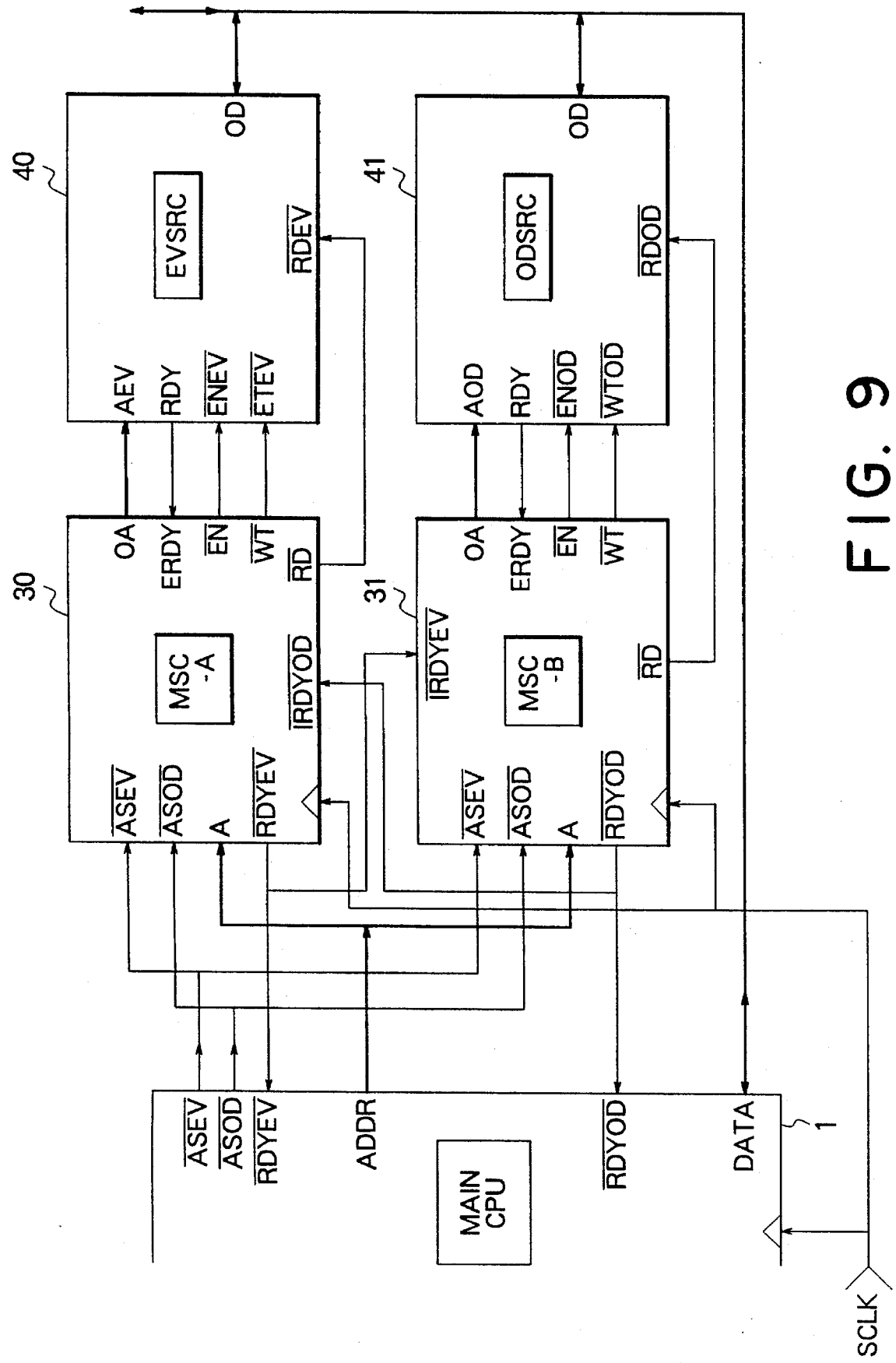
FIG. 9 shows a circuit for the timing control of the bus cycle shown in FIG. 8, FIGS. 10 and 11 show timing charts of the alternative bus state (ABS) for four address strobe signals.

FIG. 8 shows an embodiment of a system for inputting and outputting all control signals ($\overline{\text{ASEV}}$, $\overline{\text{ASOD}}$, $\overline{\text{RDYEV}}$, $\overline{\text{RDYOD}}$) to the respective machine state controllers (MSC's) which control the external resource a shown in FIG. 9 instead of the interlock control between the bus cycles by the main CPU using the address strobe as shown in FIG. 7, so that the respective MSC's independently effect the interlock control. In the present embodiment, the pipeline (P) addressing mode in which the corresponding address is generated in advance to the bus cycle is used to effect the access control in advance to gain the access time. In the NP addressing mode, since the decoding of the address is started after the address and the address strobe signal are outputted, the access operation cannot be started from the beginning of the bus state because of the overhead such as the delay time of the address strobe signal and the decoding time. On the other hand, in the P addressing mode, since the address and the address strobe signal are generated in one prior bus state to the bus cycle, the decoding is effected in advance and the overhead is eliminated and the bus cycle may be started from the beginning of the bus state. Thus, the access time is substantially gained.

In FIG. 8, it is assumed that the main CPU executes the same processing as that of FIG. 7. Since the P addressing mode is permitted, the outputs of the addresses and the address strobe signals started in the bus states at S3, S5 and S6 in FIG. 7 are started in advance in the bus states at S2, S3 and S4 in FIG. 8 indicating the execution of the P addressing mode. When operated in the P addressing mode, the bus cycle can be shortened by one bus state (1 PCLK period) compared to the operation in the NP addressing mode. In the system of FIG. 8, the machine state controllers (MSC-A 30, MSC-C 31) sense the states of the signals $\overline{\text{ASEV}}$, $\overline{\text{ASOD}}$, $\overline{\text{RDYEV}}$, $\overline{\text{RDYOD}}$ so that interlock control between the bus cycles in each MSC is attained. Namely, if the command signals to the current bus cycle and the immediately previous bus cycle ($\overline{\text{CMNDEV}}$, $\overline{\text{CMNDOD}}$: signals which are active one burst state after the start of the bus cycle and return to non-active simultaneously with the termination of the bus cycle by the signal $\overline{\text{RDY}}$) are generated in the respective MSC's, and the immediately previous bus cycle in the bus state in which the command signal is active has been terminated, the input/output control signal $\overline{\text{RD}}$ or $\overline{\text{WT}}$ to the data bus is outputted in direct synchronism with that timing, and if it has not been terminated, the signal $\overline{\text{RD}}$ or $\overline{\text{WT}}$ of the current bus cycle is generated immediately after the command signal ($\overline{\text{CMNDEV}}$ or $\overline{\text{CMNDOD}}$) of the overlapping immediately previous bus cycle becomes non-active.

In FIG. 8, in the accessing in the P mode started at S2 (the bus cycle is started at S3), the NP mode bus cycle previously started at S1 is not terminated at the end of S4 and hence the signal $\overline{\text{RDEV}}$ or $\overline{\text{WTEV}}$ is not rendered active until the command signal ($\overline{\text{CMNDOD}}$) started at S2 is terminated. Consequently, since the bus cycle started at S1 takes four bus states, one wait state is inserted in the P mode access started at S2 so that three bus states are required as in FIG. 7. However, it is seen that the P mode access started at S3 and the P mode access started at S4 do not interfere with the previous bus cycle and the bus state is completed in two bus states. Thus, the bus cycle is shortened by one bus state by the P addressing mode compared to that of FIG. 7. As a result, the bus cycles started at S9 and S11 in FIG. 7 are shifted forward by one bus state in FIG. 8 so that they start at S8, S9 and S10 and the overall efficiency of the bus system is improved accordingly. In the example of FIG. 8, the timing to read the address from the main CPU to the MSC is the end point of the bus state in which the address strobe signal is outputted, as it is in FIG. 7.

FIG. 9 shows a circuit configuration in which the units 1, 30, 31, 40 and 41 in FIG. 3 are modified to permit the timing control of the bus cycle as shown in FIG. 8. It differs from FIG. 3 in that both the signals $\overline{\text{ASEV}}$ and $\overline{\text{ASOD}}$ generated in the main CPU are supplied to both MSC's (MSC-A 30 and MSC-B 31), and the signal $\overline{\text{RDYEV}}$ from the MSC-A 30 is supplied to the MSC-B 31 and the signal $\overline{\text{RDYOD}}$ from the MSC-B 31 is supplied to the MSC-A 30. Thus, each MSC has an independent function to monitor the internal state of the other MSC (the state of the bus cycle which the other MSC is responsible for). Namely, the command signal of the other MSC can be independently generated in each MSC. Alternatively, the MSC's may communicate necessary internal signal such as command signal via an external connection. However, since a delay is included by the command signal, the generation of the signals $\overline{\text{RD}}$ and $\overline{\text{WT}}$ may be delayed thereby. Accordingly, the system of FIG. 9 is superior. The delay of signal also occurs in the interlock control system between the bus cycles which use the address strobe signal from the main CPU shown in FIGS. 7 and 3 (because the address strobe signal itself is already delayed to the signal SCLK). Accordingly, the embodiments of FIGS. 8 and 9 are superior in this regard.

Figure 10:
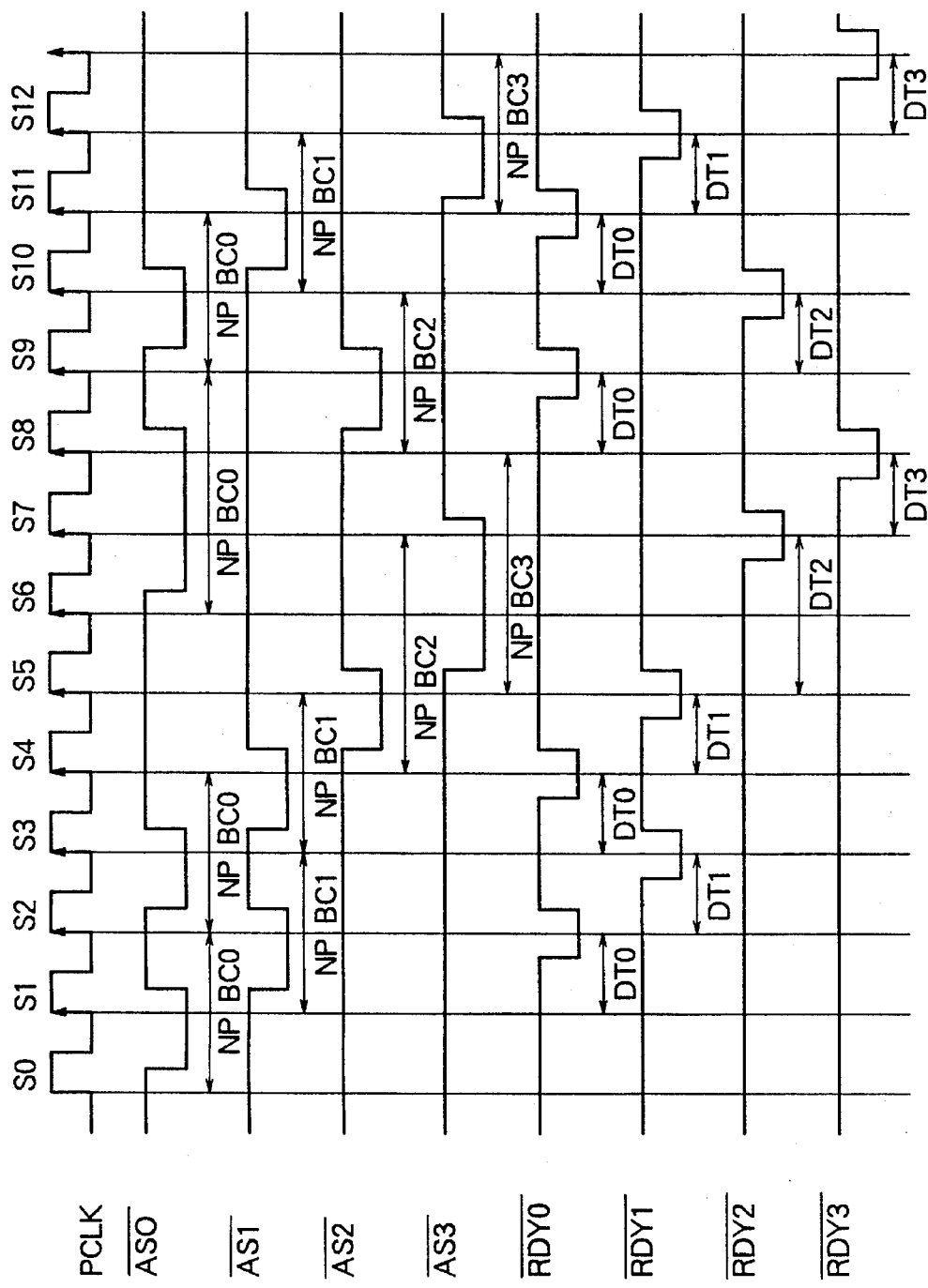
Figure 11:
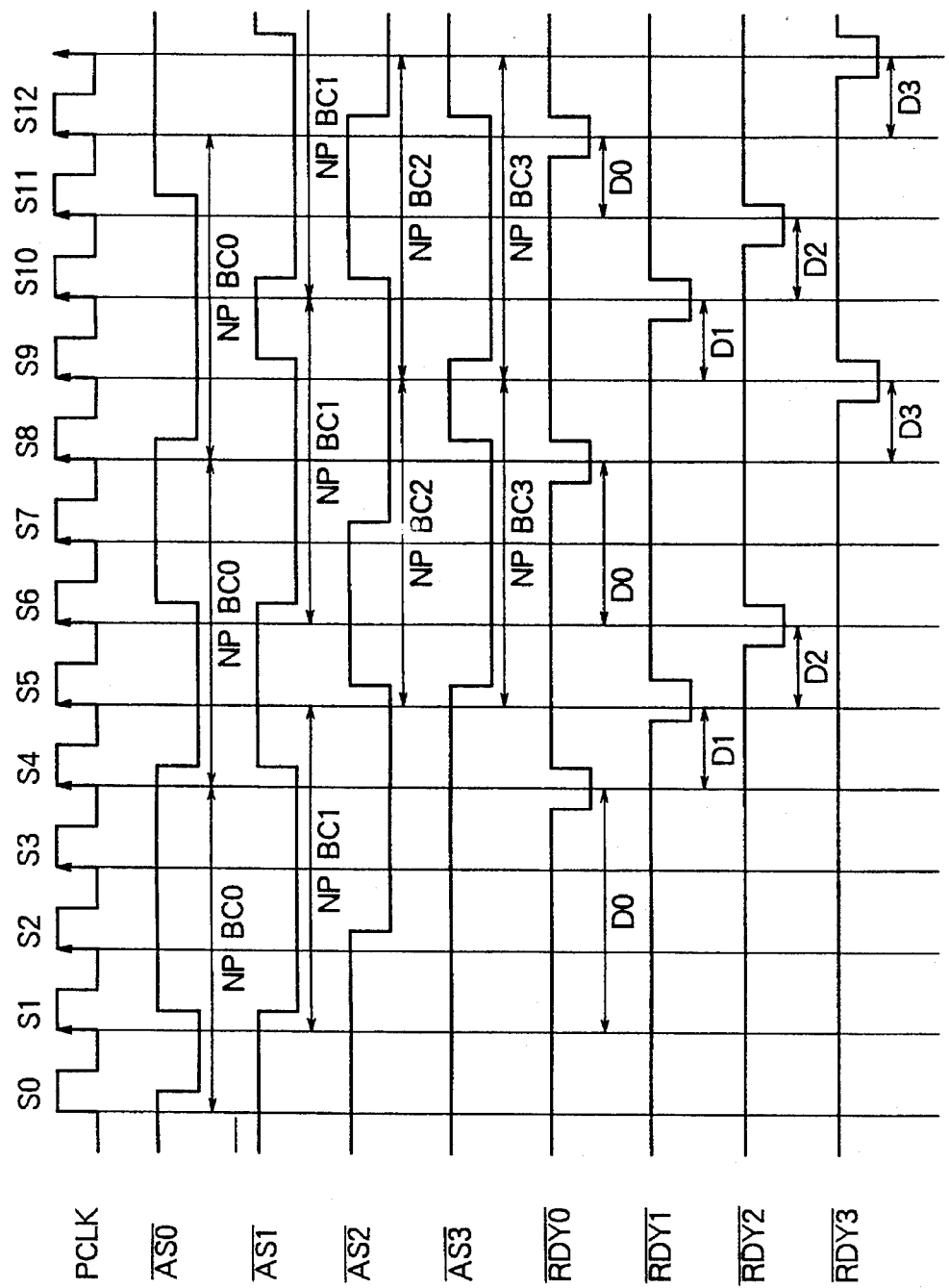

As an embodiment which uses more address strobe signals, FIGS. 10 and 11 show bus timing control of the alternative bus state (ABS) when four address strobe signals ($\overline{\text{AS0}}$, $\overline{\text{AS1}}$, $\overline{\text{AS2}}$ and $\overline{\text{AS3}}$) are used. In the figures, the bus cycles for $\overline{\text{AS0}}$~$\overline{\text{AS1}}$ are represented by BC0~BC3, and the input/output occupation periods of the corresponding data buses (the periods in which the data input/output between the main CPU and the resource are permitted in BC0~BC3) are represented by DT0~DT3. In FIGS. 10 and 11, the interlock system between the bus cycles is effected by the address strobe signal as it is in FIGS. 3 and 7. The ready signals for indicating the end of the bus cycles corresponding to $\overline{\text{AS0}}$~$\overline{\text{AS1}}$ are represented by $\overline{\text{RDY0}}$~$\overline{\text{RDY3}}$.

In the embodiment of FIG. 10, it is assumed that each bus cycle terminates basically in two bus states (2×PCLK period) and one bus state of wait state is inserted only in BC2 which starts at the state S4 so that the bus cycle terminates in three bus states (3×PCLK period). Under the effect thereof, $\overline{AS3}$ of BC3 started at S5 is extended by one bus state and the bus cycle takes three bus states (namely, the signal $\overline{RDY}^3$ from the MSC to the main CPU is delayed by one bus state and one wait state is inserted in the bus cycle). Further, by the affect thereof, similar condition occurs in BC0 started at S6 and $\overline{AS0}$ is extended by one bus state so that it takes three bus states.

In FIG. 10, the data which are valid in all bus states except the states S0 and S5 (which are idle states) are communicated with the main CPU. It is different from the previous embodiments in which two address strobe signals are used in that the probability that any one of the four address strobe signals is active when the generation of the bus cycle is randomly commanded from the main CPU (under the random access environment in which different address may be outputted for each bus cycle) is ½ when two address strobe signals are used, and it is ¼ when four address strobe signals are used. This means that the probability that the same address strobe signal is continuously active the same and it may be expressed as the probability that the efficiency of the alternative bus state (ABS) operation is temporarily lowered to that of the normal bus cycle. Namely, in the ABS which uses n address strobe signals, the probability that the efficiency of the bus cycle is lowered is 1/n, which means that the larger is the number of address strobe signals, the higher is the efficiency of the substantial bus cycle.

In FIG. 11, the basic bus cycle comprises four bus states. When compared with FIG. 10 in which the basic bus cycle comprises two bus states, the efficiency as viewed from the bus system is not lowered significantly but the delay time (the latency) from the generation of the physical address by the main CPU to the communication of necessary data with the external resource is very long and the probability that the operation efficiency of the addressing unit 1312 and the execution unit 1310 of the main CPU is lowered is high. In another view, in the bus system shown in FIG. 11 in which the basic bus cycle comprises four bus states, two wait states (2×PCLK period) of bus states are inserted in each bus cycle of the bus system of FIG. 10 in which the basic bus cycle comprises two bus states. Thus, the efficiency of the main CPU is naturally lowered by the amount corresponding to the wait states. However, the frequency (the PCLK frequency) of the main CPU is significantly improved and if the required access time of the external resource is not substantially reduced, the bus system shown in FIG. 11 is effective because the access time to the external resource may be gained.

As seen from the embodiments of FIGS. 10 and 11, in the bus system by the alternative bus states (ABS) having three or more address strobe signals, the same bus system as that by the alternative bus state (ABS) having the two address strobe signals as shown in FIGS. 7 and 8 the bus control is attained by the bus control and the interlock control based on the same rule.

Figure 12:
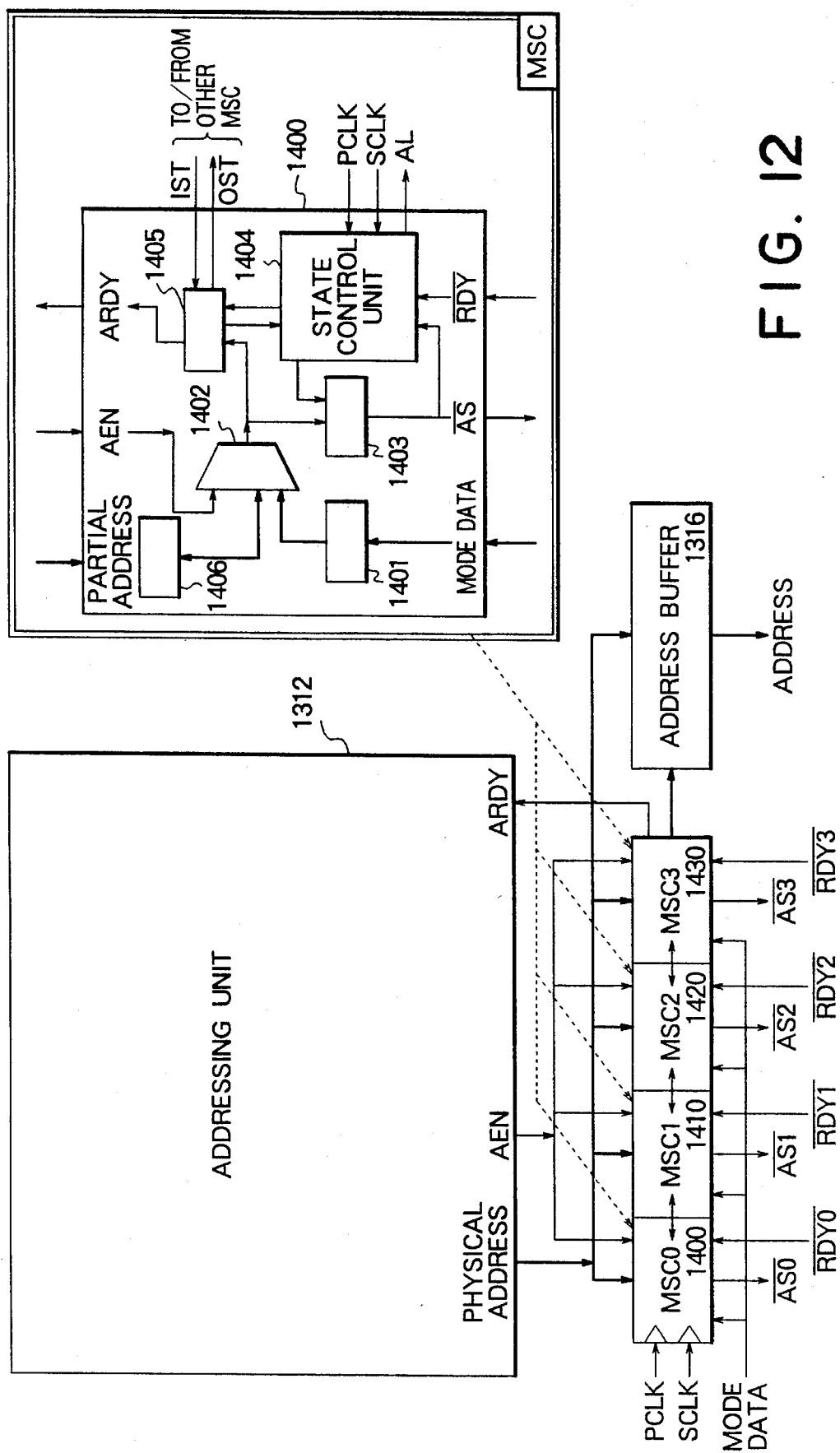
FIG. 12 shows a bus control circuit for controlling the four address strobe signals.

FIG. 12 shows a bus control circuit of the main CPU which controls four address strobe signals. FIG. 12 shows an enlarged view of the units 1312, 1316, 1317 and 1318 shown in FIG. 5. In FIG. 5, the machine state controllers MSC's (1317 and 1318) for controlling the alternative bus state (ABS) by the two address strobe signals are provided, while four such MSC's are provided in FIG. 12 to attain the alternative bus state (ABS) by the four address strobe signals as shown in FIGS. 10 and 11. Another functional difference from FIG. 5 is that the physical address and the address enable signal (AEN) are supplied as the control signal to the MSC0~MSC3 (1400~1430) from the addressing unit 1312, and the MSC0~MSC3 (1400~1430) decode the selection of themselves to determine whether to conduct the bus cycle control for the MSC's. The response signal from each MSC is combined with the signal ARDY and only one signal is sent back to the addressing unit 1312. On the other hand, in the embodiment of FIG. 5, the addressing unit 1312 determines whether to start the even address bus cycle or the odd address bus cycle and transmits it to the even address MSC 1317 and the odd address MSC 1318 by the signals AENEV and AENOD from the addressing unit 1312. In FIG. 5, the signals ARDYEN and ARDYOD are provided as the ready signal to inform to the addressing unit 1312 that the MSC's 1317 and 1318 have accepted the start of the bus cycle indicated by the addressing unit 1312 in response to the signals AENEV and AENOD. On the other hand, in the embodiment of FIG. 12. In order to control the four bus cycles more flexibly optimally generate them, the decode function to determine the generation condition of the bus cycle and the bus cycle generation function are integrally built in the MSC0~MSC3.

The internal construction of the MSC shown in FIG. 12 is explained. A necessary partial address is read to an address latch 1406 from the physical address from the addressing unit 1312, and the partial address is compared with the mode data held in the mode data latch 1401 by a comparator 1402 when the address enable signal (AEN) from the addressing unit 1312 is active, and if they match, an active match signal is generated. The AEN signal indicates, when it is active, that the partial address outputted from the addressing unit 1312 is valid. The address strobe generation circuit 1403 generates the address strobe signal ($\overline{AS}$) in response to the match signal and the control signal from the state control unit 1404. In order to transmit the interlock control information between the bus cycle to the external by using the address strobe signal, the MSC renders the signal $\overline{AS}$ active and keep the address strobe signal ($\overline{AS}$) active until all bus cycles started by other MSC's in advance to the currently generated bus cycle are terminated. To this end, the interface circuit 1405 for communicating the status of the bus cycle with other MSC's is provided between the state control unit 1404 and other MSC's. The status information (IST, OST) is communicated with other MSC's by the interface circuit 1405, and the signal ARDY is sent back to inform to the addressing unit 1312 that the fetching of the necessary physical address from the addressing unit 1312 is completed and the next address may be issued. The state control unit 1404 renders the address latch signal (AL) active in synchronism with the timing to generate the signal $\overline{AS}$ to latch the physical address to be outputted to the external from the addressing unit 1312 to the address buffer 1316, and opens the address buffer to supply the necessary physical address to the external system. Namely, it commands the address buffer 1316 to open the address buffer for more than one bus state (more than one bus state period during which the address strobe signal from other MSC becomes active), and then it releases the command to be ready for the address output for the next bus cycle.

In the present embodiment, the information corresponding to the partial address for which the MSC is to respond may be preset in the mode data latch 1401. In practice, in the initialization process before the start of the intended operation of the processor system, the relation of the address strobe signals ($\overline{AS0}$~$\overline{AS3}$) and the groups of external resources ($\overline{SRC0}$~$\overline{SRC3}$) when the external bus system is to be operated in the alternative bus state (ABS) may be set. Namely, the physical address space to which the grouped external resources are to be allocated in accordance with the area or the address bit configuration may be registered in the mode data latch 1401 as the bit pattern of the partial address for which the MSC is to generate the address strobe signal in response thereto.

In the embodiment of FIG. 12, as a function to efficiently generate the bus cycle, a physical address queue which can time-serially hold a set of addresses in the addressing unit 1312 may be provided to provide a function to temporarily store the pre-generated physical address. As a result, even if a delay is included in the generation and control of the external bus cycle by the MSC and the address buffer 1316, the probability that the addressing unit 1312 is stopped thereby and efficiency is lowered (the addressing unit cannot send out the next address) may be lowered. The address enable signal (AEN) may be set such that it is active when the valid address is present in the physical address queue. The delay is included in the external bus cycle when the alterative bus state (ABS) cannot be normally conducted (namely, when the same address strobe signal is continuously rendered active) or when the wait state is inserted in the bus cycle to lower the efficiency of the bus system. In order to attain a similar effect by another system than providing the physical address queue in the addressing unit 1312, a que system can be utilized which can time-serially store data in the partial address latch 1406 and the address buffer 1316 in the MSC0~MSC3 (1400~1430) to hold the partial address and the physical address which are prefetched from the addressing unit 1312.

Figure 13:
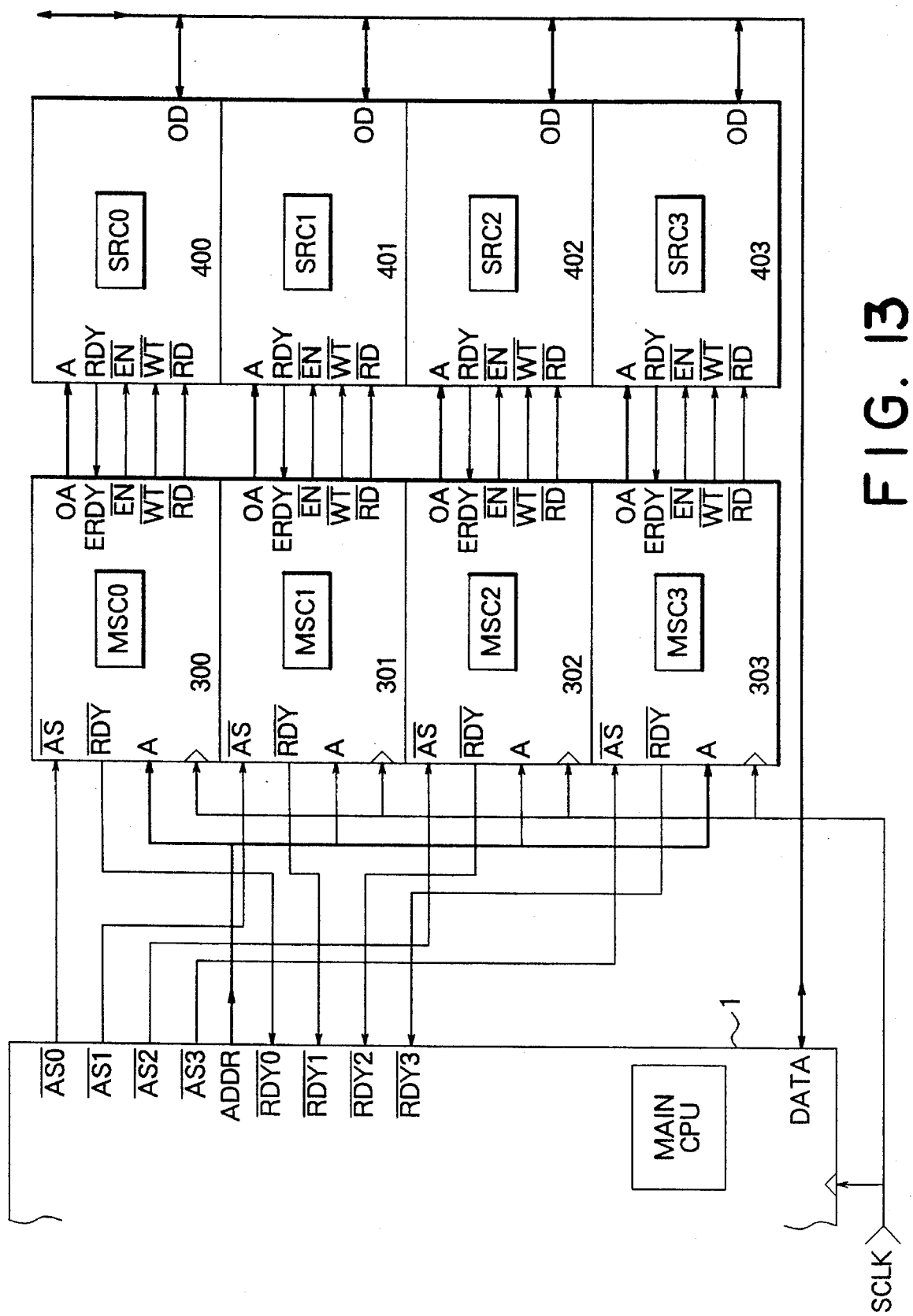
FIG. 13 shows a processor system for the alternative bus state (ABS) by using four address strobe signals.

FIG. 13 shows a configuration of a processor system by the alternative bus state (ABS) which uses four address strobe signals. This system is based on the system (the system shown in FIG. 10 or 11) which uses the address strobe ($\overline{AS0}$~$\overline{AS3}$) to control the interlock between the bus cycles. The main CPU may be one which has the bus control system as shown in FIG. 12.

As seen from FIG. 13, when compared with the configuration which uses two address strobe signals as shown in FIGS. 1 and 3, the connection rule is identical, but four machine state controllers (MSC0~MSC3) are provided, and the external resources (SRC0~SRC3) grouped correspondingly are connected. It is a fully scalable extension configuration to any number of address strobe signals. The system configuration having n address strobe signals corresponding to FIG. 9 has a similar scalability, and n address strobe signals may be supplied to all MSC's (MSC0, MSC1, ... ), and the ready signals ($\overline{RDY}^0$, $\overline{RDY}^1$, ... ), may be communicated among all MSC's.

Finally, referring to FIG. 13, the LSI implementation of the present processor system is discussed. The variations of the LSI implementation include the following four cases:

a) The main CPU 1, the MSC0~MSC3 (300~303) and SRC0~SRC3 (400~403) are integrated in a one-chip LSI or MCM (multi-chip module) or wafer scale LSI.

b) The main CPU 1 and the MSC0~MSC3 (300~303) are integrated in a one-chip LSI or MCM (multi-chip module) or wafer scale LSI.

c) The SRC's corresponding to the MSC are integrated in a one-chip LSI or MCM (multi-chip module) or wafer scale LSI.

d) All or some pairs of MSC0~MSC3 (300~303) and the SRC0~SRC3 (400~403) are integrated in a one-chip LSI or MCM (multi-chip module) or wafer scale LSI.

In the MCM (multi-chip module), functional modules (the main CPU 1, the MSC0~MSC3 (300~303 and the SRC0~SRC3 (400~403) in the case (a)) integrated on a plurality of LSI chips on a small electronic substrate (made of ceramics or glass) are arranged in the level of the paired chip of the LSI, and they are directly bonded to the electronic substrate to form one LSI package. The structure of the external input/output functional signal pins for connecting the functional modules with the external system may be a needle-like pin structure arranged on a rear side of a PGA (pin grid array) or a flat package arranged on the side of the MCA, or a solder bump arranged in grid on the entire rear side of the MCM.

What is claimed is:

1. A processor system comprising:

a main CPU for accessing data by outputting a plurality of address strobe signals and an address signal in synchronism with a bus cycle;

a signal controller responsive to the address signal and the address strobe signals for generating a plurality of latch signals, each having two bus cycles, to control input/output operations of said main CPU;

a plurality of external resources, each external resource being assigned an address signal and a respective one of the latch signals such that input/output operations to and from said main CPU are permitted in accordance with respective ones of the latch signals received in synchronism with the address signal.

2. A processor system according to claim 1 wherein the latch signals have transition times for arriving at an active level which differ by at least one period of the bus cycle, and said main CPU maintains the address corresponding to the address strobe signals for at least one period of the bus cycle after the transition of the latch signals to the active level.

3. A processor system according to claim 2 wherein said main CPU includes means responsive to the bus cycle corresponding to a first latch signal previously shifted to the active level not terminating when another latch signal shifts to the active level, for maintaining the first latch signal at the active level until the previously started bus cycle is terminated.

4. A processor system according to claim 2 wherein said signal controller includes means responsive to the latch signal once shifting to the non-active level and again shifting to the active level before the bus cycle corresponding to the address strobe signal terminates, for keeping the latch signal at the active level until the corresponding bus cycle terminates.

5. A processor system according to claim 3 wherein said signal controller generates a plurality of ready signals corresponding to the address strobe signals, and the bus cycle corresponding to the address strobe signal is terminated at a end of the bus state at which said main CPU receives the corresponding ready signal.

6. A processor system according to claim 4 wherein said signal controller generates a plurality of ready signals corresponding to the address strobe signals, and the bus cycle corresponding to the address strobe signal is terminated at a end of the bus state at which said main CPU receives the corresponding ready signal.

7. A processor system according to claim 6 wherein said main CPU includes means for imparting priority to outputting of an address of a load instruction issued later than a store instruction over outputting of an address corresponding to the store instruction.

8. A processor according to claim 7 wherein said imparting means is responsive to the address corresponding to the load instruction and the address corresponding to the store instruction being different to impart priority to the outputting of the address corresponding to the load instruction over the outputting of the address corresponding to the store instruction.

9. A processor system comprising:

an external resource;

a main CPU with a built-in bus control mechanism for accessing said external resource to input and output necessary data through a data bus in synchronism with a clock signal;

said external resource including a plurality of sub-external resources; and a plurality of controllers, one controller associated with each of said sub-external resources, for receiving an address strobe signal from said main CPU and generating and outputting to said sub-external resources a plurality of control signals and an address signal, to access said sub-external resources;

said sub-external resources inputting and outputting data with said main CPU through the data bus in accordance with the control signals and the address signal.

10. A processor system comprising:

an external resource;

a main CPU with a built-in bus control mechanism responsive to a plurality of address strobe signals and an address signal, for accessing said external resource to input and output necessary data through a data bus in synchronism with a clock signal;

said address bus providing high order address bits and at least one low order address bit, which together constitute a complete address;

said external resource including a plurality of resource elements, each element allotted a value of the low order address bits for selection of such elements, and each element accessed by high order address bits representing an address of such element; and means for outputting said at least one low order address bit as corresponding address strobe signals independently asserted to represent an enabled state, in parallel, of each element and having a cycle time of at least two cycles of the clock signal, to respective ones of said plurality of resource elements of said external resource in accordance with an instructions from said main CPU.

11. A processor system according to claim 10 wherein said main CPU includes instruction number generation means for numbering instruction codes for indicating the operations of said main CPU in the order to be processed, addressing means addressing for the access to said external resource, execution means for operating or processing data through communication of data with said external resource, and load/store means for generating an address for operand data necessary for the instruction with the access to the external by said addressing means to parallelly execute the accessing to the external resource independently from the operation of the execution means;

said processor system further comprising parallel control means for parallelly operating the bus control means, including said addressing means, said load/store means and said execution means;

instruction number transfer means for transferring the instruction number of the instruction together with the instruction processing information to said addressing means and said execution means; and instruction number compare means for comparing the instruction number in said execution means sent by said instruction number transfer means with the instruction number in said addressing means;

said execution means determining by said instruction number compare means whether the addressing of the instruction number has been completed when the instruction is to be executed, and if it has been completed, processing the operand data corresponding to the instruction in the bus cycle acquired by said bus control means or being acquired by the current bus cycle, and if it has not been completed, waiting until the completion.

12. A processor system according to claim 11 wherein said main CPU includes a machine state controller in said bus cycle control means for generating an address strobe signal for each group, said machine state controller decoding a physical address generated by said addressing means to identify the group which the address belong to, and if the group corresponding to the address strobe signal generated immediately before is different from the current group, immediately rendering the address strobe corresponding to the current group active, and if it is same as the current group, rendering the previous address strobe non-active and rendering the current address strobe active.

13. A processor system according to claim 10 wherein the low order address comprises only one least significant bit defining a word boundary of a word representing data of a maximum number of bits handled by said main CPU, and the external resource comprises even resources and odd resources, and the groups with the low order address equal to "0" are allocated to the even resources, and the groups with the low order address equal to "1" are allocated to the odd resources.

14. A processor system comprising:

an external resource;

a main CPU with a built-in bus control mechanism having a function of accessing said external resource and inputting and outputting necessary data through a data bus;

said address bus including means for generating a high order address and a low order address, to constitute a complete address;

said external resource including a plurality of resource elements allotted by some of the addresses represented by the low order address; and means for outputting corresponding address strobe signals to said external resource in accordance with an instructions from said main CPU in synchronism with the timing at which some of the addresses are outputted to the corresponding external resource elements through the address bus, said main CPU including instruction number generation means for numbering instruction codes for indicating the operations of said main CPU in the order to be processed, addressing means for providing addresses for the access to said external resource, execution means for operating or processing data through communication of data with said external resource, and load/store means for generating an address for operand data necessary for the instruction with the access to the external by said addressing means to parallel execute the accessing to the external resource independently from the operation of the execution means;

said processor system further comprising:

parallel control means for parallelly operating the bus control means, including said addressing means, said load/store means and said execution means;

instruction number transfer means for transferring the instruction number of the instruction together with the instruction processing information to said addressing means and said execution means; and instruction number compare means for comparing the instruction number in said execution means sent by said instruction number transfer means with the instruction number in said addressing means;

said execution means determining by said instruction number compare means whether the addressing of the instruction number has been completed when the instruction is to be executed, and if it has been completed, processing the operand data corresponding to the instruction in the bus cycle acquired by said bus control means or being acquired by the current bus cycle, and if it has not been completed, waiting until the completion.

15. A processor system according to claim 14 wherein said main CPU includes a machine state controller in said bus cycle control means for generating an address strobe signal for each group, said machine state controller decoding a physical address generated by said addressing means to identify the group to which the address belongs, and if the group corresponding to the address strobe signal generated immediately before is different from the current group, immediately rendering the address strobe corresponding to the current group active, and if it is same as the current group, rendering the previous address strobe non-active and rendering the current address strobe active.

16. A processor system comprising:

an external resource;

a main CPU with a built-in bus control mechanism having a function of accessing said external resource for inputting and outputting of necessary data through a data bus in synchronism with a clock;

said address bus providing high order address bits and at least one low order address bit, which together constitute a complete address;

said external resource including a plurality of resource elements, each element allotted a value of the low order address bits for selection of such elements, and each element accessed by high order address bits representing an address of such element; and means for outputting said at least one low order address bit as corresponding address strobe signals independently asserted to represent an enabled state, in parallel, of each element and having a cycle time of at least two cycles of the clock signal, to respective ones of said plurality of resource elements of said external resource in accordance with an instructions from said main CPU, said main CPU including instruction number generation means for numbering instruction codes for indicating the operations of said main CPU in the order to be processed, addressing means for providing addresses for the access to said external resource, execution means for operating or processing data through communication of data with said external resource, and load/store means for generating an address for operand data necessary for the instruction with the access to the external by said addressing means to parallel execute the accessing to the external resource independently from the operation of the execution means;

said processor system further comprising:

parallel control means for parallelly operating the bus control means, including said addressing means, said load/store means and said execution means;

instruction number transfer means for transferring the instruction number of the instruction together with the instruction processing information to said addressing means and said execution means; and instruction number compare means for comparing the instruction number in said execution means sent by said instruction number transfer means with the instruction number in said addressing means;

said execution means determining by said instruction number compare means whether the addressing of the instruction number has been completed when the instruction is to be executed, and if it has been completed, processing the operand data corresponding to the instruction in the bus cycle acquired by said bus control means or being acquired by the current bus cycle, and if it has not been completed, waiting until the completion.

17. A processor system comprising:

an external resource;

a main CPU with a built-in bus control mechanism having a function of accessing said external resource for inputting and outputting of necessary data through a data bus in synchronism with a clock;

said address bus providing high order address bits and at least one low order address bit, which together constitute a complete address;

said external resource including a plurality of resource elements, each element allotted a value of the low order address bits for selection of such elements, and each element accessed by high order address bits representing an address of such element; and means for outputting said at least one low order address bit as corresponding address strobe signals independently asserted to represent an enabled state, in parallel, of each element and having a cycle time of at least two cycles of the clock signal, to respective ones of said plurality of resource elements of said external resource in accordance with an instructions from said main CPU, said main CPU including instruction number generation means for numbering instruction codes for indicating the operations of said main CPU in the order to be processed, addressing means for providing addresses for the access to said external resource, execution means for operating or processing data through communication of data with said external resource, and load/store means for generating an address for operand data necessary for the instruction with the access to the external by said addressing means to parallel execute the accessing to the external resource independently from the operation of the execution means;

said processor system further comprising:

parallel control means for parallelly operating the bus control means, including said addressing means, said load/store means and said execution means;

instruction number transfer means for transferring the instruction number of the instruction together with the instruction processing information to said addressing means and said execution means; and instruction number compare means for comparing the instruction number in said execution means sent by said instruction number transfer means with the instruction number in said addressing means;

said load store means including means responsive to information from said instruction number compare means for determining whether said execution means has completed processing designated by the instruction from said main CPU, and if so, storing in said external responsive the result of the completed processing.

18. A processor system according to claim 17, further comprising a plurality of signal lines connecting said plurality of resource elements with said generating means for access to said plurality of resource elements.

19. A processor system according to claim 18, wherein said main CPU and said generating means are integrated in a one-chip LSI.

20. A processor system according to claim 17, wherein said main CPU and said generating means are integrated in a one-chip LSI.

21. A processor system according to claim 17, wherein said main CPU, said external resource and said generating means are integrated in a one-chip LSI.

* * * * *